United States Patent
Gardner et al.

(10) Patent No.: US 11,351,791 B2
(45) Date of Patent: Jun. 7, 2022

(54) LOGIC CIRCUITRY PACKAGE

(71) Applicant: HEWLETT-PACKARD DEVELOPMENT COMPANY, L.P., Spring, TX (US)

(72) Inventors: James Michael Gardner, Corvallis, OR (US); James William Ring, Corvallis, OR (US); David Owen Roethig, Vancouver, WA (US); Christopher Hans Bakker, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 41 days.

(21) Appl. No.: 16/768,651

(22) PCT Filed: Dec. 3, 2019

(86) PCT No.: PCT/US2019/064213
§ 371 (c)(1),
(2) Date: May 30, 2020

(87) PCT Pub. No.: WO2020/117786
PCT Pub. Date: Jun. 11, 2020

(65) Prior Publication Data
US 2021/0237435 A1    Aug. 5, 2021

Related U.S. Application Data

(63) Continuation-in-part of application No. PCT/US2019/026152, filed on Apr. 5, 2019, which is
(Continued)

(51) Int. Cl.
*B41J 2/175* (2006.01)
*B41J 2/045* (2006.01)
(Continued)

(52) U.S. Cl.
CPC ......... *B41J 2/17546* (2013.01); *B29C 64/259* (2017.08); *B33Y 30/00* (2014.12);
(Continued)

(58) Field of Classification Search
CPC .... B41J 2/17566; G01F 23/247; G01F 23/804
See application file for complete search history.

(56) References Cited

U.S. PATENT DOCUMENTS

| 4,074,284 A | 2/1978 | Dexter et al. |
| 4,506,276 A | 3/1985 | Kyser et al. |

(Continued)

FOREIGN PATENT DOCUMENTS

| AU | 2014202104 A1 | 5/2014 |
| CA | 2507422 A1 | 1/2002 |

(Continued)

OTHER PUBLICATIONS

Arnostech, "Thermal Inkjet Printers," http://www.arnostech.com/machines/coding-systems/thermal-inkjet-printers/, retrieved Jul. 1, 2019, 3 pgs.
(Continued)

*Primary Examiner* — Lam S Nguyen
(74) *Attorney, Agent, or Firm* — Dicke, Billig & Czaja, PLLC

(57) ABSTRACT

A logic circuitry package includes an interface to communicate with a print apparatus logic circuit and at least one logic circuit. The logic circuit is configured to receive, via the interface, a plurality of first requests in a heater disabled mode, each first request corresponding to a different sensor ID of a plurality of sensor IDs; transmit, via the interface, a first digital value in response to each first request; receive, via the interface, a plurality of second requests in a heater enabled mode, each second request corresponding to a different sensor ID of the plurality of sensor IDs; and
(Continued)

transmit, via the interface, a second digital value in response to each second request. Delta values corresponding to a difference between the first digital value and the second digital value for each different sensor ID of the plurality of sensor IDs are indicative of a print material level.

24 Claims, 15 Drawing Sheets

Related U.S. Application Data a continuation-in-part of application No. PCT/US2019/026133, filed on Apr. 5, 2019, which is a continuation-in-part of application No. PCT/US2019/026161, filed on Apr. 5, 2019, which is a continuation-in-part of application No. PCT/US2018/063631, filed on Dec. 3, 2018.

(51) Int. Cl.

| | | |
|---|---|---|
| *G06F 13/42* | (2006.01) | |
| *G06F 21/44* | (2013.01) | |
| *G06F 1/12* | (2006.01) | |
| *G06F 1/08* | (2006.01) | |
| *H03K 19/0175* | (2006.01) | |
| *B33Y 30/00* | (2015.01) | |
| *B29C 64/259* | (2017.01) | |
| *G06F 3/12* | (2006.01) | |
| *G01F 23/24* | (2006.01) | |
| *G01F 23/80* | (2022.01) | |

(52) U.S. Cl.
CPC ......... *B41J 2/0458* (2013.01); *B41J 2/04508* (2013.01); *B41J 2/04541* (2013.01); *B41J 2/04546* (2013.01); *B41J 2/04563* (2013.01); *B41J 2/04586* (2013.01); *B41J 2/1753* (2013.01); *B41J 2/17513* (2013.01); *B41J 2/17526* (2013.01); *B41J 2/17566* (2013.01); *G01F 23/247* (2013.01); *G01F 23/802* (2022.01); *G01F 23/804* (2022.01); *G06F 1/08* (2013.01); *G06F 1/12* (2013.01); *G06F 3/121* (2013.01); *G06F 13/4291* (2013.01); *G06F 21/44* (2013.01); *H03K 19/017509* (2013.01); *G06F 13/42* (2013.01); *G06F 2213/0016* (2013.01)

(56) References Cited

U.S. PATENT DOCUMENTS

| | | | |
|---|---|---|---|
| 4,639,738 A | 1/1987 | Young et al. |
| 4,734,787 A | 3/1988 | Hayashi |
| 5,001,596 A | 3/1991 | Hart |
| 5,045,811 A | 9/1991 | Lewis |
| 5,079,570 A | 1/1992 | Mohr et al. |
| 5,142,909 A | 9/1992 | Baughman |
| 5,329,254 A | 7/1994 | Takano |
| 5,438,351 A | 8/1995 | Trenchard et al. |
| 5,471,176 A | 11/1995 | James et al. |
| 5,583,544 A | 12/1996 | Stamer et al. |
| 5,680,960 A | 10/1997 | Keyes et al. |
| 5,682,184 A | 10/1997 | Stephany et al. |
| 5,699,091 A | 12/1997 | Bullock et al. |
| 5,731,824 A | 3/1998 | Kneezel et al. |
| 5,751,323 A | 5/1998 | Swanson |
| 5,757,406 A | 5/1998 | Kaplinsky et al. |
| 5,777,646 A | 7/1998 | Barinaga et al. |
| 5,788,388 A | 8/1998 | Cowger et al. |
| 5,861,780 A | 1/1999 | Fukuda |
| 5,975,688 A | 11/1999 | Kanaya et al. |
| 6,068,363 A | 5/2000 | Saito |
| 6,098,457 A | 8/2000 | Poole |
| 6,151,039 A | 11/2000 | Hmelar et al. |
| 6,164,766 A | 12/2000 | Erickson |
| 6,175,929 B1 | 1/2001 | Hsu et al. |
| 6,219,933 B1 | 4/2001 | Taniguchi et al. |
| 6,299,273 B1 | 10/2001 | Anderson et al. |
| 6,312,074 B1 | 11/2001 | Walker |
| 6,341,853 B1 | 1/2002 | Scheffelin et al. |
| 6,386,693 B1 | 5/2002 | Michele |
| 6,402,299 B1 | 6/2002 | DeMeerleer |
| 6,412,901 B2 | 7/2002 | Su et al. |
| 6,431,670 B1 | 8/2002 | Schantz et al. |
| 6,456,802 B1 | 9/2002 | Phillips |
| 6,457,355 B1 | 10/2002 | Philipp |
| 6,494,553 B1 | 12/2002 | Donahue et al. |
| 6,494,568 B2 | 12/2002 | Hou et al. |
| 6,598,963 B1 | 7/2003 | Yamamoto et al. |
| 6,641,240 B2 | 11/2003 | Hsu et al. |
| 6,641,243 B2 | 11/2003 | Anderson et al. |
| 6,648,434 B2 | 11/2003 | Walker et al. |
| 6,685,290 B1 | 2/2004 | Farr et al. |
| 6,736,497 B2 | 5/2004 | Jung |
| 6,796,644 B1 | 9/2004 | Anderson, Jr. et al. |
| 6,802,581 B2 | 10/2004 | Hasseler et al. |
| 6,802,602 B2 | 10/2004 | Sakai et al. |
| 6,811,250 B2 | 11/2004 | Buchanan et al. |
| 6,902,256 B2 | 6/2005 | Anderson et al. |
| 6,908,179 B2 | 6/2005 | Pan et al. |
| 6,959,599 B2 | 11/2005 | Feldstein et al. |
| 6,966,222 B2 | 11/2005 | Carson et al. |
| 6,969,137 B2 | 11/2005 | Maeda |
| 7,039,734 B2 | 5/2006 | Sun et al. |
| 7,077,506 B2 | 7/2006 | Chen |
| 7,171,323 B2 | 1/2007 | Shipton et al. |
| 7,240,130 B2 | 7/2007 | Larson |
| 7,260,662 B2 | 8/2007 | Moriwaki et al. |
| 7,328,115 B2 | 2/2008 | Shipton et al. |
| 7,380,042 B2 | 5/2008 | Wang et al. |
| 7,458,656 B2 | 12/2008 | Smith |
| 7,533,960 B2 | 5/2009 | Yasuda et al. |
| 7,547,082 B2 | 6/2009 | Lee et al. |
| 7,630,304 B2 | 12/2009 | Larson et al. |
| 7,686,423 B2 | 3/2010 | Sato et al. |
| 7,740,347 B2 | 6/2010 | Silverbrook et al. |
| 7,775,638 B2 | 8/2010 | Hirosawa et al. |
| 7,841,712 B2 | 11/2010 | Muyskens et al. |
| 7,886,197 B2 | 2/2011 | Wegman |
| 7,890,690 B2 | 2/2011 | Naderi et al. |
| 7,970,042 B2 | 6/2011 | Hardin et al. |
| 8,040,215 B2 | 10/2011 | Zakriti |
| 8,161,224 B2 | 4/2012 | Laurencin et al. |
| 8,215,018 B2 | 7/2012 | Morita et al. |
| 8,220,910 B2 | 7/2012 | Wanibe |
| 8,224,602 B2 | 7/2012 | Lory et al. |
| 8,289,788 B2 | 10/2012 | Asauchi |
| 8,331,581 B2 | 12/2012 | Pennock |
| 8,348,377 B2 | 1/2013 | Asauchi |
| 8,350,628 B1 | 1/2013 | George et al. |
| 8,364,859 B2 | 1/2013 | Sato |
| 8,386,657 B2 | 2/2013 | Adkins et al. |
| 8,393,718 B2 | 3/2013 | Kida et al. |
| 8,393,721 B2 | 3/2013 | Katoh et al. |
| 8,429,437 B2 | 4/2013 | Asauchi |
| 8,432,421 B2 | 4/2013 | Muraki et al. |
| 8,438,919 B2 | 5/2013 | Phillips et al. |
| 8,454,137 B2 | 6/2013 | Price et al. |
| 8,556,394 B2 | 10/2013 | Chen |
| 8,558,577 B1 | 10/2013 | Soriano Fosas et al. |
| 8,562,091 B2 | 10/2013 | Sabanovic et al. |
| 8,591,012 B2 | 11/2013 | Yoshino et al. |
| 8,608,276 B2 | 12/2013 | Oohashi et al. |
| 8,621,116 B2 | 12/2013 | Fister et al. |
| 8,651,614 B2 | 2/2014 | Sakamoto et al. |
| 8,651,643 B2 | 2/2014 | Harvey et al. |
| 8,721,059 B2 | 5/2014 | Kodama et al. |
| 8,721,203 B2 | 5/2014 | Ehrhardt, Jr. |
| 8,752,943 B2 | 6/2014 | Hirano et al. |
| 8,864,277 B2 | 10/2014 | Rice et al. |
| 8,876,257 B2 | 11/2014 | Harada et al. |

(56) References Cited

U.S. PATENT DOCUMENTS

| | | |
|---|---|---|
| 8,888,207 B2 | 11/2014 | Furness, III et al. |
| 8,892,798 B2 | 11/2014 | Tailliet et al. |
| 8,898,358 B2 | 11/2014 | DeCesaris et al. |
| 8,978,487 B2 | 3/2015 | Fergusson et al. |
| 8,990,467 B2 | 3/2015 | Saito |
| 9,079,414 B2 | 7/2015 | Lester et al. |
| 9,108,448 B1 | 8/2015 | Bergstedt |
| 9,132,656 B2 | 9/2015 | Nicholson, III et al. |
| 9,137,093 B1 | 9/2015 | Abraham et al. |
| 9,176,921 B2 | 11/2015 | Fister et al. |
| 9,194,734 B2 * | 11/2015 | Mehrer .............. G01F 23/247 |
| 9,213,396 B1 | 12/2015 | Booth et al. |
| 9,213,927 B1 | 12/2015 | Ahne et al. |
| 9,254,661 B2 | 2/2016 | Otaka et al. |
| 9,298,908 B1 | 3/2016 | Booth et al. |
| 9,370,934 B2 | 6/2016 | Asauchi et al. |
| 9,400,204 B2 | 7/2016 | Schoenberg |
| 9,413,356 B1 | 8/2016 | McKinley |
| 9,413,359 B2 | 8/2016 | Stirk |
| 9,454,504 B2 | 9/2016 | Evans |
| 9,483,003 B2 | 11/2016 | Thacker, III |
| 9,487,017 B2 | 11/2016 | Ge et al. |
| 9,496,884 B1 | 11/2016 | Azenkot et al. |
| 9,511,596 B2 | 12/2016 | Anderson et al. |
| 9,561,662 B2 | 2/2017 | Ward et al. |
| 9,582,443 B1 | 2/2017 | Switzer et al. |
| 9,599,500 B2 | 3/2017 | Ge et al. |
| 9,619,663 B2 | 4/2017 | Refstrup |
| 9,671,820 B2 | 6/2017 | Maruyama et al. |
| 9,734,121 B2 | 8/2017 | Pitigoi-Aron et al. |
| 9,738,087 B2 | 8/2017 | Kato et al. |
| 9,746,799 B2 | 8/2017 | Jeran |
| 9,770,914 B2 | 9/2017 | Harvey et al. |
| 9,776,412 B2 | 10/2017 | Ge et al. |
| 9,789,697 B1 | 10/2017 | Knierim et al. |
| 9,796,178 B2 | 10/2017 | Maxfield |
| 9,852,282 B2 | 12/2017 | Jeran et al. |
| 9,876,794 B2 | 1/2018 | Adkins et al. |
| 9,895,917 B2 | 2/2018 | Corvese et al. |
| 9,914,306 B2 | 3/2018 | Jeran |
| 9,922,276 B2 | 3/2018 | Fister et al. |
| 9,994,036 B2 | 6/2018 | Angulo Navarro et al. |
| 10,031,882 B2 | 7/2018 | Srivastava et al. |
| 10,052,878 B2 | 8/2018 | Benneton |
| 10,107,667 B2 * | 10/2018 | Cumbie .............. G01F 23/247 |
| 10,146,608 B2 | 12/2018 | Giovannini et al. |
| 10,155,379 B2 | 12/2018 | Ng et al. |
| 10,214,018 B2 | 2/2019 | Nozawa et al. |
| 10,214,019 B2 | 2/2019 | Campbell-Brown et al. |
| 10,259,230 B2 | 4/2019 | Asauchi |
| 10,279,594 B2 | 5/2019 | Horade |
| 10,338,838 B2 | 7/2019 | Olarig |
| 10,471,725 B2 | 11/2019 | Esterberg et al. |
| 10,875,318 B1 | 12/2020 | Gardner et al. |
| 10,894,423 B2 | 1/2021 | Gardner et al. |
| 11,034,157 B2 | 6/2021 | Gardner et al. |
| 2001/0029554 A1 | 10/2001 | Namba |
| 2001/0033316 A1 | 10/2001 | Eida |
| 2002/0012016 A1 | 1/2002 | Wilson et al. |
| 2002/0012616 A1 | 1/2002 | Zhou et al. |
| 2002/0033855 A1 | 3/2002 | Kubota et al. |
| 2002/0109761 A1 | 8/2002 | Shimizu et al. |
| 2002/0129650 A1 | 9/2002 | Zimmermann |
| 2002/0154181 A1 | 10/2002 | Kubota et al. |
| 2003/0009595 A1 | 1/2003 | Collins |
| 2003/0018300 A1 | 1/2003 | Duchon et al. |
| 2003/0071862 A1 | 4/2003 | Tsukada et al. |
| 2003/0202024 A1 | 10/2003 | Corrigan |
| 2004/0021711 A1 | 2/2004 | Hasseler |
| 2004/0036733 A1 | 2/2004 | Kubota et al. |
| 2004/0085382 A1 | 5/2004 | Kosugi et al. |
| 2004/0155913 A1 | 8/2004 | Kosugi et al. |
| 2004/0252146 A1 | 12/2004 | Naka et al. |
| 2005/0010910 A1 | 1/2005 | Lindhorst et al. |
| 2005/0093910 A1 | 5/2005 | Im |
| 2005/0125105 A1 | 6/2005 | Halstead et al. |
| 2005/0126282 A1 | 6/2005 | Maatuk |
| 2005/0185595 A1 | 8/2005 | Lee |
| 2005/0229699 A1 | 10/2005 | Chai et al. |
| 2006/0007253 A1 | 1/2006 | Kosugi |
| 2006/0007295 A1 | 1/2006 | Ueda |
| 2006/0072952 A1 | 4/2006 | Walmsley |
| 2006/0110199 A1 | 5/2006 | Walmsley et al. |
| 2006/0181583 A1 | 8/2006 | Usuda |
| 2006/0181719 A1 | 8/2006 | Aoki et al. |
| 2006/0221386 A1 | 10/2006 | Brooks et al. |
| 2006/0244795 A1 | 11/2006 | Hayasaki et al. |
| 2006/0268030 A1 | 11/2006 | Walmsley et al. |
| 2006/0274103 A1 | 12/2006 | Kim |
| 2006/0290723 A1 | 12/2006 | Jeong et al. |
| 2007/0024650 A1 | 2/2007 | Reinten et al. |
| 2007/0068249 A1 | 3/2007 | Eguchi et al. |
| 2007/0088816 A1 | 4/2007 | Hrustemovic et al. |
| 2007/0115307 A1 | 5/2007 | Smith |
| 2007/0146409 A1 | 6/2007 | Kubota et al. |
| 2007/0247497 A1 | 10/2007 | Buchanan et al. |
| 2008/0024555 A1 | 1/2008 | Kimura |
| 2008/0041152 A1 | 2/2008 | Schoenberg |
| 2008/0107151 A1 | 5/2008 | Khadkikar et al. |
| 2008/0129779 A1 | 6/2008 | Walmsley et al. |
| 2008/0143476 A1 | 6/2008 | Cheung et al. |
| 2008/0165232 A1 | 7/2008 | Yuen |
| 2008/0192074 A1 | 8/2008 | Dubois et al. |
| 2008/0211838 A1 | 9/2008 | Zhang |
| 2008/0246626 A1 | 10/2008 | Sheafor et al. |
| 2008/0298455 A1 | 12/2008 | Ilia et al. |
| 2008/0307134 A1 | 12/2008 | Geissler et al. |
| 2009/0013779 A1 | 1/2009 | Usui |
| 2009/0021766 A1 | 1/2009 | Yamazaki |
| 2009/0177823 A1 | 7/2009 | Chao |
| 2009/0179678 A1 | 7/2009 | Hardin |
| 2009/0290005 A1 | 11/2009 | Wanibe |
| 2009/0309941 A1 | 12/2009 | Price |
| 2010/0082271 A1 | 4/2010 | McCann et al. |
| 2010/0138745 A1 | 6/2010 | McNamara |
| 2010/0205350 A1 | 8/2010 | Bryant-Rich |
| 2010/0220128 A1 | 9/2010 | Zaba |
| 2010/0248208 A1 | 9/2010 | Okubo et al. |
| 2010/0254202 A1 | 10/2010 | Asauchi |
| 2010/0257327 A1 | 10/2010 | Kosugi |
| 2010/0306431 A1 | 12/2010 | Adkins et al. |
| 2011/0009938 A1 | 1/2011 | Dowling |
| 2011/0029705 A1 | 2/2011 | Evans |
| 2011/0050793 A1 | 3/2011 | Kumagai et al. |
| 2011/0087914 A1 | 4/2011 | Files et al. |
| 2011/0113171 A1 | 5/2011 | Radhakrishnan et al. |
| 2011/0131441 A1 | 6/2011 | Asauchi |
| 2011/0279530 A1 | 11/2011 | Love |
| 2011/0285027 A1 | 11/2011 | Lee |
| 2012/0128379 A1 | 5/2012 | Takeda |
| 2012/0243559 A1 | 9/2012 | Pan et al. |
| 2012/0284429 A1 | 11/2012 | Adkins et al. |
| 2012/0299989 A1 | 11/2012 | Prothon |
| 2013/0018513 A1 | 1/2013 | Ecobee |
| 2013/0054933 A1 | 2/2013 | Fister |
| 2013/0067015 A1 | 3/2013 | Vasters |
| 2013/0067016 A1 | 3/2013 | Adkins |
| 2013/0155142 A1 | 6/2013 | Browning et al. |
| 2013/0250024 A1 | 9/2013 | Kakishima |
| 2013/0295245 A1 | 11/2013 | Gardner |
| 2014/0040517 A1 | 2/2014 | Fister et al. |
| 2014/0095750 A1 | 4/2014 | Tailliet |
| 2014/0164660 A1 | 6/2014 | DeCesaris et al. |
| 2014/0211241 A1 | 7/2014 | Rice et al. |
| 2014/0260520 A1 | 9/2014 | Schoenberg |
| 2014/0265049 A1 | 9/2014 | Burris et al. |
| 2014/0337553 A1 | 11/2014 | Du et al. |
| 2014/0351469 A1 | 11/2014 | Fister et al. |
| 2014/0354729 A1 | 12/2014 | Vanbrocklin et al. |
| 2014/0372652 A1 | 12/2014 | Shu |
| 2014/0375321 A1 | 12/2014 | Ikeya |
| 2014/0375730 A1 | 12/2014 | Campbell-Brown |
| 2015/0028671 A1 | 1/2015 | Ragaini et al. |
| 2015/0052996 A1 | 2/2015 | Niemann |

(56) References Cited

U.S. PATENT DOCUMENTS

| | | |
|---|---|---|
| 2015/0074304 A1 | 3/2015 | Adkins et al. |
| 2015/0089630 A1 | 3/2015 | Lee |
| 2015/0239254 A1 | 8/2015 | Muyskens et al. |
| 2015/0285526 A1 | 10/2015 | Smith et al. |
| 2015/0343792 A1 | 12/2015 | Refstrup |
| 2016/0055402 A1 | 2/2016 | Fister et al. |
| 2016/0098359 A1 | 4/2016 | Adkins et al. |
| 2016/0110535 A1 | 4/2016 | Booth et al. |
| 2016/0114590 A1 | 4/2016 | Arpin |
| 2016/0279962 A1 | 9/2016 | Ishida et al. |
| 2016/0357691 A1 | 12/2016 | Ahne |
| 2016/0364305 A1 | 12/2016 | Pitigou-Aron |
| 2016/0368273 A1 | 12/2016 | Ishikawa |
| 2017/0032135 A1 | 2/2017 | Refstrup |
| 2017/0050383 A1 | 2/2017 | Bell et al. |
| 2017/0100941 A1 | 4/2017 | Kuribayashi |
| 2017/0144448 A1 | 5/2017 | Smith |
| 2017/0157929 A1 | 6/2017 | Yokoo et al. |
| 2017/0168976 A1 | 6/2017 | Yost et al. |
| 2017/0169623 A1 | 6/2017 | Chen et al. |
| 2017/0182786 A1 | 6/2017 | Angulo Navarro |
| 2017/0189011 A1 | 7/2017 | Stone et al. |
| 2017/0194913 A1 | 7/2017 | Wilson et al. |
| 2017/0230540 A1 | 8/2017 | Sasaki |
| 2017/0330449 A1 | 11/2017 | Lunardhi |
| 2018/0050537 A1 | 2/2018 | Bakker et al. |
| 2018/0100753 A1 | 4/2018 | Cumbie et al. |
| 2018/0143935 A1 | 5/2018 | Cox |
| 2018/0157943 A1 | 6/2018 | Fister et al. |
| 2018/0162137 A1 | 6/2018 | Van Brocklin et al. |
| 2018/0212593 A1 | 7/2018 | Usuda |
| 2018/0264808 A1 | 9/2018 | Bakker et al. |
| 2018/0281394 A1 | 10/2018 | Horade et al. |
| 2018/0281438 A1 | 10/2018 | Horade |
| 2018/0290457 A1 | 10/2018 | Ge et al. |
| 2018/0302110 A1 | 10/2018 | Solan |
| 2018/0304640 A1 | 10/2018 | Horne |
| 2019/0004991 A1 | 1/2019 | Foust |
| 2019/0011306 A1 | 1/2019 | Cumbie et al. |
| 2019/0012663 A1 | 1/2019 | Masters |
| 2019/0013731 A2 | 1/2019 | Gritti |
| 2019/0023020 A1 | 1/2019 | Anderson |
| 2019/0061347 A1 | 2/2019 | Bakker et al. |
| 2019/0064408 A1 | 2/2019 | Smit |
| 2019/0097785 A1 | 3/2019 | Elenes |
| 2019/0111694 A1 | 4/2019 | Cumbie et al. |
| 2019/0111695 A1 | 4/2019 | Anderson et al. |
| 2019/0111696 A1 | 4/2019 | Anderson et al. |
| 2019/0118527 A1 | 4/2019 | Anderson et al. |
| 2019/0126631 A1 | 5/2019 | Anderson et al. |
| 2019/0137316 A1 | 5/2019 | Anderson et al. |
| 2019/0138484 A1 | 5/2019 | De Santiago Dominguez et al. |
| 2019/0217628 A1 | 7/2019 | Horade et al. |
| 2019/0226930 A1 | 7/2019 | Cumbie et al. |
| 2019/0240985 A1 | 8/2019 | Ge et al. |
| 2020/0159689 A1 | 5/2020 | Koshisaka et al. |
| 2021/0334392 A1 | 10/2021 | Panshin et al. |

FOREIGN PATENT DOCUMENTS

| | | |
|---|---|---|
| CN | 2603934 Y | 2/2004 |
| CN | 2734479 Y | 10/2005 |
| CN | 201761148 U | 3/2011 |
| CN | 102231054 A | 11/2011 |
| CN | 203651218 U | 6/2014 |
| CN | 102736627 B | 12/2014 |
| CN | 103879149 B | 6/2015 |
| CN | 105760318 A | 7/2016 |
| CN | 107209743 A | 9/2017 |
| CN | 108819486 A | 11/2018 |
| CN | 209014461 U | 6/2019 |
| DE | 3712699 A1 | 11/1988 |
| EP | 0015954 B1 | 6/1984 |
| EP | 0720916 A2 | 7/1996 |
| EP | 0994779 A1 | 4/2000 |
| EP | 1164022 A2 | 12/2001 |
| EP | 1238811 A1 | 9/2002 |
| EP | 1285764 A1 | 2/2003 |
| EP | 1314565 A2 | 5/2003 |
| EP | 1389531 A1 | 2/2004 |
| EP | 1524120 A2 | 4/2005 |
| EP | 1800872 A1 | 6/2007 |
| EP | 1839872 A1 | 10/2007 |
| EP | 2237163 A1 | 10/2010 |
| EP | 2385468 A1 | 11/2011 |
| EP | 2854063 A1 | 4/2015 |
| EP | 3208736 A1 | 8/2017 |
| GB | 2519181 A | 4/2015 |
| JP | H04220353 A | 8/1992 |
| JP | 2001292133 A | 10/2001 |
| JP | 2002026471 A | 1/2002 |
| JP | 2003326726 A | 11/2003 |
| JP | 2005262458 A | 9/2005 |
| JP | 2009258604 A | 11/2009 |
| JP | 2010079199 A | 4/2010 |
| JP | 2011113336 A | 6/2011 |
| JP | 2012063770 A | 3/2012 |
| JP | 2013197677 A | 9/2013 |
| JP | 5644052 B2 | 12/2014 |
| JP | 2014534917 A | 12/2014 |
| JP | 2016185664 A | 10/2016 |
| JP | 2017196842 A | 11/2017 |
| JP | 2018049141 A | 3/2018 |
| JP | 2018136774 A | 8/2018 |
| JP | 2018161785 A | 10/2018 |
| JP | 2018531394 A | 10/2018 |
| KR | 20080003539 A | 1/2008 |
| KR | 101785051 B1 | 10/2017 |
| TW | 200707209 A | 2/2007 |
| TW | 201202948 A | 1/2012 |
| TW | 201546620 A | 12/2015 |
| WO | WO-2007107957 A1 | 9/2007 |
| WO | WO-2008117194 A1 | 10/2008 |
| WO | WO-2009145774 A1 | 12/2009 |
| WO | WO-2012020443 A8 | 2/2012 |
| WO | WO-2012054050 A1 | 4/2012 |
| WO | WO-2012057755 A1 | 5/2012 |
| WO | WO-2013048430 A1 | 4/2013 |
| WO | WO-2015116092 A1 | 8/2015 |
| WO | WO-2016061480 A2 | 4/2016 |
| WO | WO-2016114759 A1 | 7/2016 |
| WO | WO-2016130157 A1 | 8/2016 |
| WO | WO-2017074334 A1 | 5/2017 |
| WO | WO-2017074342 A1 | 5/2017 |
| WO | WO-2017174363 A1 | 10/2017 |
| WO | WO-2017184147 A1 | 10/2017 |
| WO | WO-2017189009 A1 | 11/2017 |
| WO | WO-2017189010 A1 | 11/2017 |
| WO | WO-2017189011 A1 | 11/2017 |
| WO | WO-2017189013 A1 | 11/2017 |
| WO | WO-2018017066 A1 | 1/2018 |
| WO | WO-2018022038 A1 | 2/2018 |
| WO | WO-2018186847 A1 | 10/2018 |
| WO | WO-2018199886 A1 | 11/2018 |
| WO | WO-2018199891 A1 | 11/2018 |
| WO | WO-2018199895 A1 | 11/2018 |
| WO | WO-2018217185 A1 | 11/2018 |
| WO | WO-2019017963 A1 | 1/2019 |
| WO | WO-2019078834 A1 | 4/2019 |
| WO | WO-2019078835 A1 | 4/2019 |
| WO | WO-2019078839 A1 | 4/2019 |
| WO | WO-2019078840 A1 | 4/2019 |
| WO | WO-2019078843 A1 | 4/2019 |
| WO | WO-2019078844 A1 | 4/2019 |
| WO | WO-2019078845 A1 | 4/2019 |

OTHER PUBLICATIONS

Epson, "Epson Provides the Best Inks for the Job," https://www.epson.co.nz/microsite/excellence/inks_why.asp, retrieved Jul. 1, 2019, 3 pgs.

(56) References Cited

OTHER PUBLICATIONS

Platform Development Team, "Development of the HP DeskJet 1200C Print Cartridge Platform," Hewlett-Packard Journal, Feb. 1994, pp. 46-54.

International Searching Authority, "International Search Report and Written Opinion," issued in connection with PCT/US2019/026159, dated Aug. 13, 2019, 15 pgs.

International Searching Authority, "International Search Report and Written Opinion," issued in connection with PCT/US2018/063624, dated Aug. 23, 2019, 13 pgs.

International Searching Authority, "International Search Report and Written Opinion," issued in connection with PCT/US2018/063630, dated Aug. 22, 2019, 15 pgs.

International Searching Authority, "International Search Report and Written Opinion," issued in connection with PCT/US2018/063633, dated Jul. 23, 2019, 12 pgs.

International Searching Authority, "International Search Report and Written Opinion," issued in connection with PCT/US2018/063638, dated Aug. 26, 2019, 13 pgs.

International Searching Authority, "International Search Report and Written Opinion," issued in connection with PCT/US2018/063643, dated Aug. 20, 2019, 13 pgs.

International Searching Authority, "International Search Report and Written Opinion," issued in connection with PCT/US2019/017511, dated Jul. 25, 2019, 12 pgs.

International Searching Authority, "International Search Report and Written Opinion," issued in connection with PCT/US2019/026124, dated Aug. 26, 2019, 15 pgs.

International Searching Authority, "International Search Report and Written Opinion," issued in connection with PCT/US2019/026133, dated Aug. 26, 2019, 18 pgs.

International Searching Authority, "International Search Report and Written Opinion," issued in connection with PCT/US2019/026145, dated Sep. 5, 2019, 16 pgs.

International Searching Authority, "International Search Report and Written Opinion," issued in connection with PCT/US2019/026161, dated Aug. 26, 2019, 20 pgs.

International Searching Authority, "International Search Report and Written Opinion," issued in connection with PCT/US2018/063631, dated Aug. 23, 2019, 13 pgs.

Maxim Integrated Products, "1-to-8 I2C Bus Switches/Multiplexers with Bus Lock-Up Detection, Isolation, and Notification," Sep. 2008, 22 pgs.

NXP, "Introducing A10006 Secure Authenticator Tamper-Resistant Anti Counterfeit Solution", retreived Jul. 3, 2019, 29 pgs.

NXP B.V., "NXP 2-, 4-, and 8-Channel I2C/SMBus Muxes and Switches PCA954x," Jul. 2008, 4 pgs.

NXP Semiconductors N.V., "PCA9641: 2-Channel I2C-Bus Master Arbiter," Oct. 27, 2015, 55 pgs.

Laureto, John et al., "Open Source Multi-Head 3D Printer for Polymer-Metal Composite Component Manufacturing," Technologies, MDPI, 2017, 5 (2), pp. 36, 23 pgs.

NXP Semiconductors N.V., "PCA9547: 8-Channel I2C-Bus Multiplexer with Reset," Apr. 1, 2014, 34 pgs.

NXP Semiconductors N.V., "An 11593: How to Design in and Program the PCA9641 I2C Arbiter," Oct. 23, 2014, 22 pgs.

Reddit, "Use an Accelerometer to Measure Z wobble", retreived Jul. 1, 2019, 3 pgs, https://www.reddit.com/r/Reprap/comments/6qsoyd/use_an_accelerometer_to_measure_z_wobble/.

Phillips Semiconductors, "The I2C-Bus Specification", Version 2.1, Jan. 2000, 46 pgs.

United States Patent and Trademark Office, "Non-Final Office Action," issued in connection with U.S. Appl. No. 16/502,479, dated Dec. 11, 2019, 13 pgs.

United States Patent and Trademark Office, "Non-Final Office Action," issued in connection with U.S. Appl. No. 16/460,016, dated Sep. 12, 2019, 12 pgs.

United States Patent and Trademark Office, "Non-Final Office Action," issued in connection with U.S. Appl. No. 16/505,090, dated Sep. 10, 2019, 20 pgs.

United States Patent and Trademark Office, "Notice of Allowance," issued in connection with U.S. Appl. No. 16/502,479, dated Apr. 9, 2020, 9 pgs.

United States Patent and Trademark Office, "Notice of Allowance," issued in connection with U.S. Appl. No. 16/460,016, dated Mar. 25, 2020, 10 pgs.

United States Patent and Trademark Office, "Notice of Allowance," issued in connection with U.S. Appl. No. 16/505,090, dated Feb. 12, 2020, 9 pgs.

United States Patent and Trademark Office, "Notice of Allowance," issued in connection with U.S. Appl. No. 16/505,090, dated Oct. 22, 2019, 5 pgs.

United States Patent and Trademark Office, "Notice of Allowance," issued in connection with U.S. Appl. No. 16/728,207, dated Feb. 19, 2020, 19 pgs.

United States Patent and Trademark Office, "Restriction Requirement," issued in connection with U.S. Appl. No. 16/502,479, dated Aug. 15, 2019, 7 pgs.

\* cited by examiner

LOGIC CIRCUITRY PACKAGE

CROSS REFERENCE TO RELATED APPLICATIONS

This application is a U.S. National Stage Application of PCT Application No. PCT/US2019/064213, filed Dec. 3, 2019, entitled "LOGIC CIRCUITRY PACKAGE," which claims priority to PCT Application No. PCT/US2019/026133, filed Apr. 5, 2019, entitled "LOGIC CIRCUITRY"; PCT Application No. PCT/US2019/026152, filed Apr. 5, 2019, entitled "FLUID PROPERTY SENSOR"; PCT Application No. PCT/US2019/026161, filed Apr. 5, 2019, entitled "LOGIC CIRCUITRY"; and PCT Application No. PCT/US2018/063631, filed Dec. 3, 2018, entitled "LOGIC CIRCUITRY"; all of which are incorporated herein by reference.

BACKGROUND

Subcomponents of apparatus may communicate with one another in a number of ways. For example, Serial Peripheral Interface (SPI) protocol, Bluetooth Low Energy (BLE), Near Field Communications (NFC) or other types of digital or analog communications may be used.

Some two-dimensional (2D) and three-dimensional (3D) printing systems include one or more replaceable print apparatus components, such as print material containers (e.g., inkjet cartridges, toner cartridges, ink supplies, 3D printing agent supplies, build material supplies etc.), inkjet printhead assemblies, and the like. In some examples, logic circuitry associated with the replaceable print apparatus component(s) communicate with logic circuitry of the print apparatus in which they are installed, for example communicating information such as their identity, capabilities, status and the like. In further examples, print material containers may include circuitry to execute one or more monitoring functions such as print material level sensing.

DETAILED DESCRIPTION

Figure 1:
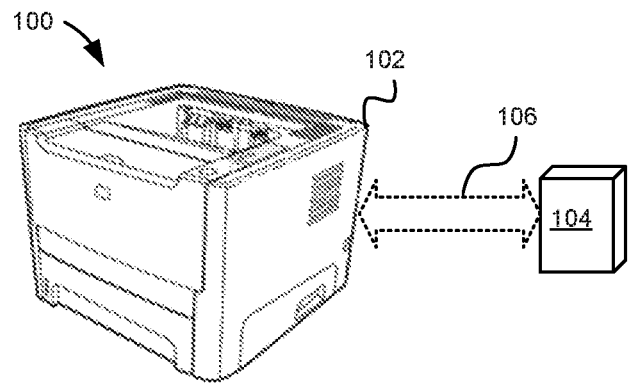
FIG. 1 illustrates one example of a printing system.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Some examples of applications described herein are in the context of print apparatus. Not all the examples, however, are limited to such applications, and at least some of the principles set out herein may be used in other contexts. The contents of other applications and patents cited in this disclosure are incorporated by reference.

In certain examples, Inter-integrated Circuit ($I^2C$, or I2C, which notation is adopted herein) protocol allows at least one 'master' integrated circuit (IC) to communicate with at least one 'slave' IC, for example via a bus. I2C, and other communications protocols, communicate data according to a clock period. For example, a voltage signal may be generated, where the value of the voltage is associated with data. For example, a voltage value above X volts may indicate a logic "1" whereas a voltage value below X volts may indicate a logic "0", where X is a predetermined numerical value. By generating an appropriate voltage in each of a series of clock periods, data can be communicated via a bus or another communication link.

Certain example print material containers have slave logic that utilize I2C communications, although in other examples, other forms of digital or analog communications could also be used. In the example of I2C communication, a master IC may generally be provided as part of the print apparatus (which may be referred to as the 'host') and a replaceable print apparatus component would comprise a 'slave' IC, although this need not be the case in all examples. There may be a plurality of slave ICs connected to an I2C communication link or bus (for example, containers of different colors of print agent). The slave IC(s) may include a processor to perform data operations before responding to requests from logic circuitry of the print system.

Communications between print apparatus and replaceable print apparatus components installed in the apparatus (and/or the respective logic circuitry thereof) may facilitate various functions. Logic circuitry within a print apparatus may receive information from logic circuitry associated with a replaceable print apparatus component via a communications interface, and/or may send commands to the replaceable print apparatus component logic circuitry, which may include commands to write data to a memory associated therewith, or to read data therefrom.

For example, logic circuitry associated with a replaceable print apparatus component may include a print material (e.g., fluid) level sensor arranged inside a reservoir of the replaceable print apparatus component. The print material level sensor may include a plurality of heater cells and corresponding temperature sensor cells. The print material level may be determined by transmitting first requests to the logic circuitry to read each of the temperature sensor cells with the heater cells disabled and second requests to read each of the temperature sensor cells again after enabling the corresponding heater cells. The unheated values may be subtracted from the heated values for each temperature sensor cell to generate delta values such that the effect of sensor cell to sensor cell variations are reduced or eliminated. The first derivative of the delta values (e.g., the difference between delta values for sensor cells two locations apart) for each temperature sensor cell are then calculated and compared to a threshold value to determine the print material level.

In at least some of the examples described below, a logic circuitry package is described. The logic circuitry package may be associated with a replaceable print apparatus component, for example being internally or externally affixed thereto, for example at least partially within the housing, and is adapted to communicate data with a print apparatus controller via a bus provided as part of the print apparatus.

A 'logic circuitry package' as the term is used herein refers to one logic circuit, or more logic circuits that may be interconnected or communicatively linked to each other. Where more than one logic circuit is provided, these may be encapsulated as a single unit, or may be separately encapsulated, or not encapsulated, or some combination thereof. The package may be arranged or provided on a single substrate or a plurality of substrates. In some examples, the package may be directly affixed to a cartridge wall. In some examples, the package may include an interface, for example including pads or pins. The package interface may be intended to connect to a communication interface of the print apparatus component that in turn connects to a print apparatus logic circuit, or the package interface may connect directly to the print apparatus logic circuit. Example packages may be configured to communicate via a serial bus interface. Where more than one logic circuit is provided, these logic circuits may be connected to each other or to the interface, to communicate through the same interface.

In some examples, each logic circuitry package is provided with at least one processor and memory. In one example, the logic circuitry package may be, or may function as, a microcontroller or secure microcontroller. In use, the logic circuitry package may be adhered to or integrated with the replaceable print apparatus component. A logic circuitry package may alternatively be referred to as a logic circuitry assembly, or simply as logic circuitry or processing circuitry.

In some examples, the logic circuitry package may respond to various types of requests (or commands) from a host (e.g., a print apparatus). A first type of request may include a request for data, for example identification and/or authentication information. A second type of request from a host may be a request to perform a physical action, such as performing at least one measurement. A third type of request may be a request for a data processing action. There may be additional types of requests. In this disclosure, a command is also a type of request.

In some examples, there may be more than one address associated with a particular logic circuitry package, which is used to address communications sent over a bus to identify the logic circuitry package which is the target of a communication (and therefore, in some examples, with a replaceable print apparatus component). In some examples, different requests are handled by different logic circuits of the package. In some examples, the different logic circuits may be associated with different addresses. For example, cryptographically authenticated communications may be associated with secure microcontroller functions and a first I2C address, while other communications may be associated with a sensor circuit and a second and/or reconfigured I2C address. In certain examples, these other communications via the second and/or reconfigured address can be scrambled or otherwise secured, not using the key used for the secure microcontroller functions.

In at least some examples, a plurality of such logic circuitry packages (each of which may be associated with a different replaceable print apparatus component) may be connected to an I2C bus. In some examples, at least one address of the logic circuitry package may be an I2C compatible address (herein after, an I2C address), for example in accordance with an I2C protocol, to facilitate directing communications between master to slaves in accordance with the I2C protocol. For example, a standard I2C communications address may be 7 or 10 bits in length. In other examples, other forms of digital and/or analog communication can be used.

FIG. 1 illustrates one example of a printing system 100. The printing system 100 includes a print apparatus 102 in communication with logic circuitry associated with a replaceable print apparatus component 104 via a communications link 106. In some examples, the communications link 106 may include an I2C capable or compatible bus (herein after, an I2C bus). Although for clarity, the replaceable print apparatus component 104 is shown as external to the print apparatus 102, in some examples, the replaceable print apparatus component 104 may be housed within the print apparatus.

The replaceable print apparatus component 104 may include, for example, a print material container or cartridge (which could be a build material container for 3D printing, a liquid or dry toner container for 2D printing, or an ink or liquid print agent container for 2D or 3D printing), which may in some examples include a print head or other dispensing or transfer component. The replaceable print apparatus component 104 may, for example, contain a consumable resource of the print apparatus 102, or a component which is likely to have a lifespan which is less (in some examples, considerably less) than that of the print apparatus 102. Moreover, while a single replaceable print apparatus component 104 is shown in this example, in other examples, there may be a plurality of replaceable print apparatus components, for example including print agent containers of different colors, print heads (which may be integral to the containers), or the like. In other examples, the print apparatus components 104 could include service components, for example to be replaced by service personnel, examples of which could include print heads, toner process cartridges, or logic circuit package by itself to adhere to corresponding print apparatus component and communicate to a compatible print apparatus logic circuit.

Figure 2:
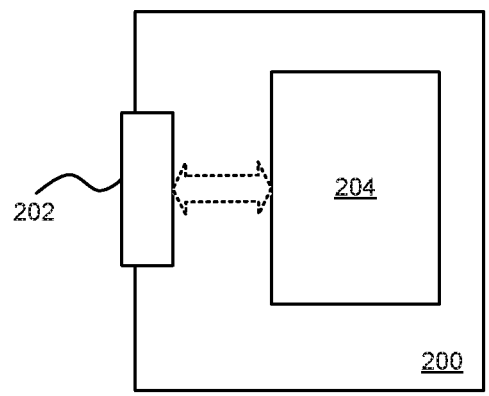
FIG. 2 illustrates one example of a replaceable print apparatus component.

FIG. 2 illustrates one example of a replaceable print apparatus component 200, which may provide the replaceable print apparatus component 104 of FIG. 1. The replaceable print apparatus component 200 includes a data interface 202 and a logic circuitry package 204. In use of the replaceable print apparatus component 200, the logic circuitry package 204 decodes data received via the data interface 202. The logic circuitry may perform other functions as set out below. The data interface 202 may include an I2C or other interface. In certain examples, the data interface 202 may be part of the same package as the logic circuitry package 204.

In some examples, the logic circuitry package 204 may be further configured to encode data for transmission via the data interface 202. In some examples, there may be more than one data interface 202 provided. In some examples, the logic circuitry package 204 may be arranged to act as a 'slave' in I2C communications.

Figure 3:
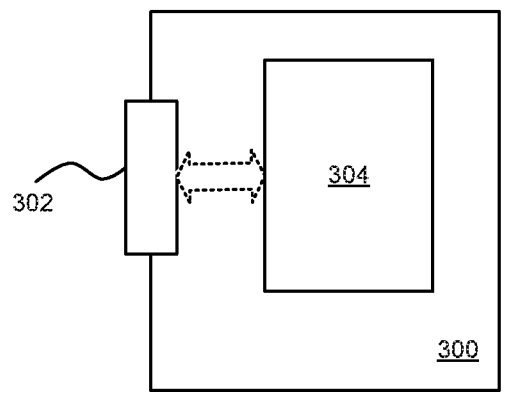
FIG. 3 illustrates one example of a print apparatus.

FIG. 3 illustrates one example of a print apparatus 300. The print apparatus 300 may provide the print apparatus 102 of FIG. 1. The print apparatus 300 may serve as a host for replaceable components. The print apparatus 300 includes an interface 302 for communicating with a replaceable print apparatus component and a controller 304. The controller 304 includes logic circuitry. In some examples, the interface 302 is an I2C interface.

In some examples, controller 304 may be configured to act as a host, or a master, in I2C communications. The controller 304 may generate and send commands to at least one replaceable print apparatus component 200, and may receive and decode responses received therefrom. In other examples the controller 304 may communicate with the logic circuitry package 204 using any form of digital or analog communication.

The print apparatus 102, 300 and replaceable print apparatus component 104, 200, and/or the logic circuitry thereof, may be manufactured and/or sold separately. In an example, a user may acquire a print apparatus 102, 300 and retain the apparatus 102, 300 for a number of years, whereas a plurality of replaceable print apparatus components 104, 200 may be purchased in those years, for example as print agent is used in creating a printed output. Therefore, there may be at least a degree of forwards and/or backwards compatibility between print apparatus 102, 300 and replaceable print apparatus components 104, 200. In many cases, this compatibility may be provided by the print apparatus 102, 300 as the replaceable print apparatus components 104, 200 may be relatively resource constrained in terms of their processing and/or memory capacity.

Figure 4A:
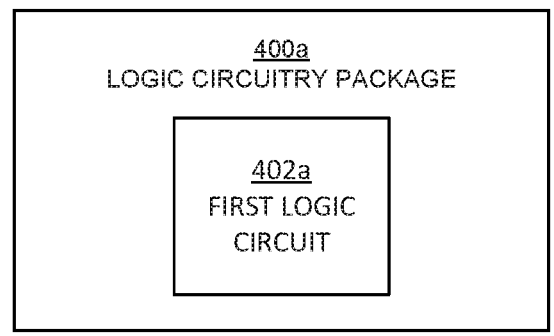
FIGS. 4A-4E illustrate examples of logic circuitry packages and processing circuitry.

FIG. 4A illustrates one example of a logic circuitry package 400a, which may for example provide the logic circuitry package 204 described in relation to FIG. 2. The logic circuitry package 400a may be associated with, or in some examples affixed to and/or be incorporated at least partially within, a replaceable print apparatus component 200.

In some examples, the logic circuitry package 400a is addressable via a first address and includes a first logic circuit 402a, wherein the first address is an I2C address for the first logic circuit 402a. In some examples, the first address may be configurable. In other examples, the first address is a fixed address (e.g., "hard-wired") intended to remain the same address during the lifetime of the first logic circuit 402a. The first address may be associated with the logic circuitry package 400a at and during the connection with the print apparatus logic circuit, outside of the time periods that are associated with a second address, as will be set out below. In example systems where a plurality of replaceable print apparatus components are to be connected to a single print apparatus, there may be a corresponding plurality of different first addresses. In certain examples, the first addresses can be considered standard I2C addresses for logic circuitry packages 400a or replaceable print components.

In some examples, the logic circuitry package 400a is also addressable via a second address. For example, the second address may be associated with different logic functions or, at least partially, with different data than the first address. In some examples, the second address may be associated with a different hardware logic circuit or a different virtual device than the first address. The hardware logic circuit can include analog sensor functions. In some examples, the logic circuitry package 400a may include a memory to store the second address (in some examples in a volatile manner). In some examples, the memory may include a programmable address memory register for this purpose. The second address may have a default second address while the second address (memory) field may be reconfigurable to a different address. For example, the second address may be reconfigurable to a temporary address by a second address command, whereby it is set (back) to the default second address after or at each time period command to enable the second address. For example, the second address may be set to its default address in an out-of-reset state whereby, after each reset, it is reconfigurable to the temporary (i.e., reconfigured) address.

In some examples, the package 400a is configured such that, in response to a first command indicative of a first time period sent to the first address (and in some examples a task), the package 400a may respond in various ways. In some examples, the package 400a is configured such that it is accessible via at least one second address for the duration of the time period. Alternatively or additionally, in some examples, the package may perform a task, which may be the task specified in the first command. In other examples, the package may perform a different task. The first command may, for example, be sent by a host such as a print apparatus in which the logic circuitry package 400a (or an associated replaceable print apparatus component) is installed. As set out in greater detail below, the task may include activating a heater or obtaining a sensor reading.

Further communication may be directed to memory addresses to be used to request information associated with these memory addresses. The memory addresses may have a different configuration than the first and second address of the logic circuitry package 400a. For example, a host apparatus may request that a particular memory register is read out onto the bus by including the memory address in a read command. In other words, a host apparatus may have a knowledge and/or control of the arrangement of a memory. For example, there may be a plurality of memory registers and corresponding memory addresses associated with the second address. A particular register may be associated with a value, which may be static or reconfigurable. The host apparatus may request that the register be read out onto the bus by identifying that register using the memory address. In some examples, the registers may include any or any combination of address register(s), parameter register(s) (for example to store gain and/or offset parameters), sensor identification register(s) (which may store an indication of a type of sensor), sensor reading register(s) (which may store values read or determined using a sensor), sensor number register(s) (which may store a number or count of sensors), version identity register(s), memory register(s) to store a count of clock cycles, memory register(s) to store a value indicative of a read/write history of the logic circuitry, or other registers.

Figure 4B:
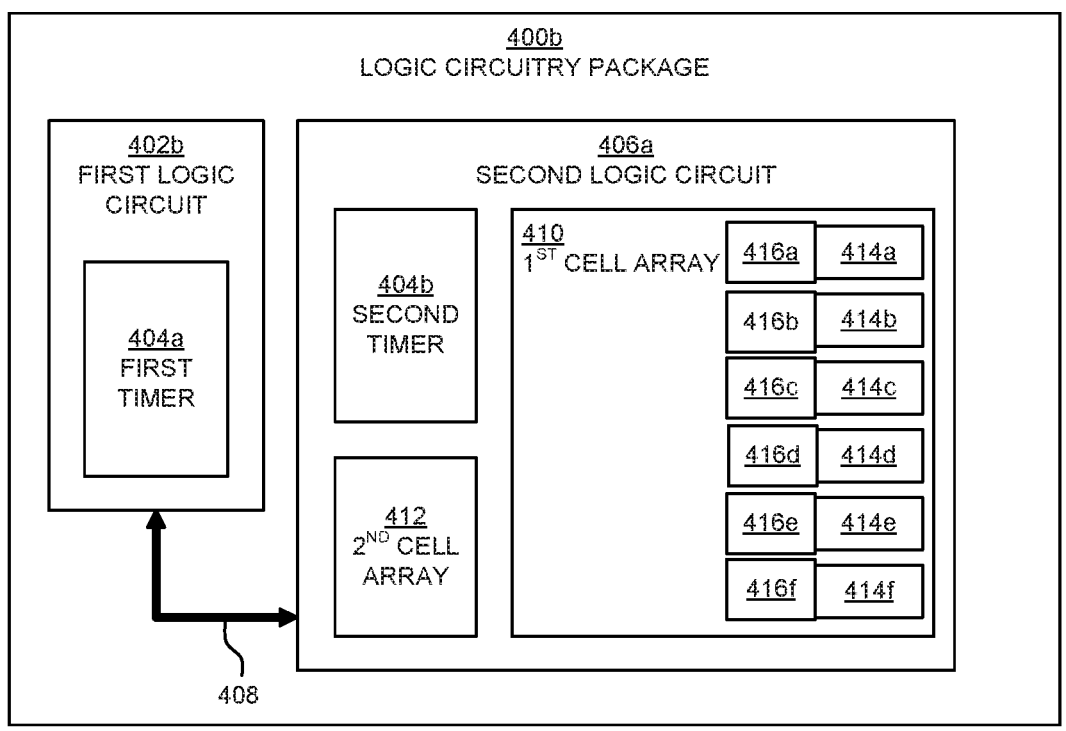

FIG. 4B illustrates another example of a logic circuitry package 400b. In this example, the package 400b includes a first logic circuit 402b, in this example, including a first timer 404a, and a second logic circuit 406a, in this example, including a second timer 404b. While in this example, each of the first and second logic circuits 402b, 406a include its own timer 404a, 404b, in other examples, they may share a timer or reference at least one external timer. In a further example, the first logic circuit 402b and the second logic circuit 406a are linked by a dedicated signal path 408. In other examples, that are not the topic of FIG. 4B, a single integrated logic circuit may simulate the functions of the second logic circuit.

Back to FIG. 4B, in one example, the logic circuitry package 400b may receive a first command including two data fields. A first data field is a one byte data field setting a requested mode of operation. For example, there may be a plurality of predefined modes, such as a first mode, in which the logic circuitry package 400b is to ignore data traffic sent to the first address (for example, while performing a task), and a second mode in which the logic circuitry package 400b is to ignore data traffic sent to the first address and to transmit an enable signal to the second logic circuit 406a, as is further set out below. The first command may include additional fields, such as an address field and/or a request for acknowledgement.

The logic circuitry package 400b is configured to process the first command. If the first command cannot be complied with (for example, a command parameter is of an invalid length or value, or it is not possible to enable the second logic circuit 406a), the logic circuitry package 400b may generate an error code and output this to a communication link to be returned to host logic circuitry, for example in the print apparatus.

If, however, the first command is validly received and can be complied with, the logic circuitry package 400b measures the duration of the time period included in the first command, for example utilizing the timer 404a. In some examples, the timer 404a may include a digital "clock tree". In other examples, the timer 404a may include an RC circuit, a ring oscillator, or some other form of oscillator or timer. In yet other examples, the timer may include a plurality of delay circuits each of which is set to expire after a certain time period, whereby depending on the timer period indicated in a first command, the delay circuit is chosen.

In this example, in response to receiving a valid first command, the first logic circuit 402b enables the second logic circuit 406a and effectively disables the first address, for example by tasking the first logic circuit 402b with a processing task. In some examples, enabling the second logic circuit 406a includes sending, by the first logic circuit 402b, an activation signal to the second logic circuit 406a. In other words, in this example, the logic circuitry package 400b is configured such that the second logic circuit 406a is selectively enabled by the first logic circuit 402b. The first logic circuit 402b is configured to use the first timer 404a to determine the duration of the enablement, that is, to set the time period of the enablement.

In this example, the second logic circuit 406a is enabled by the first logic circuit 402b sending a signal via a signal path 408, which may or may not be a dedicated signal path 408, that is, dedicated to enable the second logic circuit 406a. In one example, the first logic circuit 402b may have a dedicated contact pin or pad connected to the signal path 408, which links the first logic circuit 402b and the second logic circuit 406a. In a particular example, the dedicated contact pin or pad may be a General Purpose Input/Output (a GPIO) pin of the first logic circuit 402b. The contact pin/pad may serve as an enablement contact of the second logic circuit 406a.

In this example, the second logic circuit 406a is addressable via at least one second address. In some examples, when the second logic circuit 406a is activated or enabled, it may have an initial, or default, second address, which may be an I2C address or have some other address format. The second logic circuit 406a may receive instructions from a master or host logic circuitry to reconfigure the initial second address to a temporary second address. In some examples, the temporary second address may be an address which is selected by the master or host logic circuitry. This may allow the second logic circuit 406a to be provided in one of a plurality of packages 400 on the same I2C bus which, at least initially, share the same initial second address. This shared, default, address may later be set to a specific temporary address by the print apparatus logic circuit, thereby allowing the plurality of packages to have different second addresses during their temporary use, facilitating communications to each individual package. At the same time, providing the same initial second address may have manufacturing or testing advantages.

In some examples, the second logic circuit 406a may include a memory. The memory may include a programmable address register to store the initial and/or temporary second address (in some examples in a volatile manner). In some examples, the second address may be set following, and/or by executing, an I2C write command. In some examples, the second address may be settable when the enablement signal is present or high, but not when it is absent or low. The second address may be set to a default address when an enablement signal is removed and/or on restoration of enablement of the second logic circuit 406a. For example, each time the enable signal over the signal path 408 is low, the second logic circuit 406a, or the relevant part(s) thereof, may be reset. The default address may be set when the second logic circuit 406a, or the relevant part(s) thereof, is switched out-of-reset. In some examples, the default address is a 7-bit or 10-bit identification value. In some examples, the default address and the temporary second address may be written in turn to a single, common, address register. For example, while the first address of the first logic circuit is different for each different associated print material (e.g., different color inks have different first addresses), the second logic circuits can be the same for the different print materials and have the same initial second address.

In the example illustrated in FIG. 4B, the second logic circuit 406a includes a first array 410 of cells and at least one second cell 412 or second array of second cells of a different type than the cells of the first array 410. In some examples, the second logic circuit 406a may include additional sensor cells of a different type than the cells of the first array 410 and the at least one second cell 412. Each of the plurality of sensor types may be identifiable by a different sensor ID, while each cell in a cell array of the same type may also be identifiable by sensor ID. The sensor ID may include both the sensor type ID to select the array or type and the sensor cell ID to select the cell in the selected type or array, whereby the latter may also be called "sub-"ID. The sensor IDs (including the sub-IDs) may include a combination of addresses and values, for example register addresses and values. The addresses of the sensor cell array ID and the sensor cell ID may be different. For example, an address selects a register that has a function to select a particular sensor or cell, and in the same transaction, the value selects the sensor or cell, respectively. Hence, the second logic circuit may include registers and multiplex circuitry to select sensor cells in response to sensor IDs. In examples where there is only one cell of a certain sensor type, one sensor ID may be sufficient to select that cell. At the same time, for that single sensor cell, different sensor "sub-"IDs will not affect the sensor cell selection because there is only one sensor cell. In this disclosure, sensor ID parameters are described. A sensor ID parameter may include a sensor ID. A sensor ID parameter may include a sensor type ID or a sensor cell ID. The same sensor ID (e.g., to select a sensor type) and different sensor sub-IDs (e.g., to select a sensor cell) may be used to select different sensor cells. The sensor ID parameters can include only the sensor sub-ID, for example where the sensor type has been previously set so that only the sensor cell needs to be selected.

The first cells 416a-416f, 414a-414f and the at least one second cell 412 can include resistors. The first cells 416a-416f, 414a-414f and the at least one second cell 412 can include sensors. In one example, the first cell array 410 includes a print material level sensor and the at least one second cell 412 includes another sensor and/or another sensor array, such as an array of strain sensing cells. Further sensor types may include temperature sensors, resistors, diodes, crack sensors (e.g., crack sense resistors), etc. In this disclosure, different sensor types may also be referred to as different sensor classes. As mentioned, earlier, this disclosure encompasses alternative examples (e.g., mentioned with reference to FIG. 13) of logic circuitry packages without the described analog sensor cell arrays, whereby responses may be generated based on class parameters (i.e., sensor ID parameters) without using a physical sensor cell for generating the output. A sensor selection or sensor ID may also be referred to as class selection.

In this example, the first cell array 410 includes a sensor configured to detect a print material level of a print supply, which may in some examples be a solid but in examples described herein is a liquid, for example, an ink or other liquid print agent. The first cell array 410 may include a series of temperature sensor cells (e.g., cells 414a-414f) and a series of heating elements (e.g., cells 416a-416f), for example similar in structure and function as compared to the level sensor arrays described in WO2017/074342, WO2017/184147, and WO2018/022038. In this example, the resistance of a resistor cell 414 is linked to its temperature. The heater cells 416 may be used to heat the sensor cells 414 directly or indirectly using a medium. The subsequent behavior of the sensor cells 414 depends on the medium in which they are submerged, for example whether they are in liquid (or in some examples, encased in a solid medium) or in air. Those which are submerged in liquid/encased may generally lose heat quicker than those which are in air because the liquid or solid may conduct heat away from the resistor cells 414 better than air. Therefore, a liquid level may be determined based on which of the resistor cells 414 are exposed to the air, and this may be determined based on a reading of their resistance following (at least the start of) a heat pulse provided by the associated heater cell 416. In one example, temperature sensor cells 414a-414f are used for print material level sensing, whereas other temperature sensors, of a different type, may be used to detect an ambient and/or fluid temperature.

In some examples, each sensor cell 414 and heater cell 416 are stacked with one being directly on top of the other. The heat generated by each heater cell 416 may be substantially spatially contained within the heater element layout perimeter, so that heat delivery is substantially confined to the sensor cell 414 stacked directly above the heater cell 416. In some examples, each sensor cell 414 may be arranged between an associated heater cell 416 and the fluid/air interface.

In this example, the second cell array 412 includes a plurality of different cells that may have a different function such as different sensing function(s). For example, the first and second cell array 410, 412 may include different resistor types. Different cells arrays 410, 412 for different functions may be provided in the second logic circuit 406a. More than two different sensor types may be provided, for example three, four, five or more sensor types, may be provided, wherein each sensor type may be represented by one or more sensor cells. Certain cells or cell arrays may function as stimulators (e.g., heaters) or reference cells, rather than as sensors.

Figure 4C:
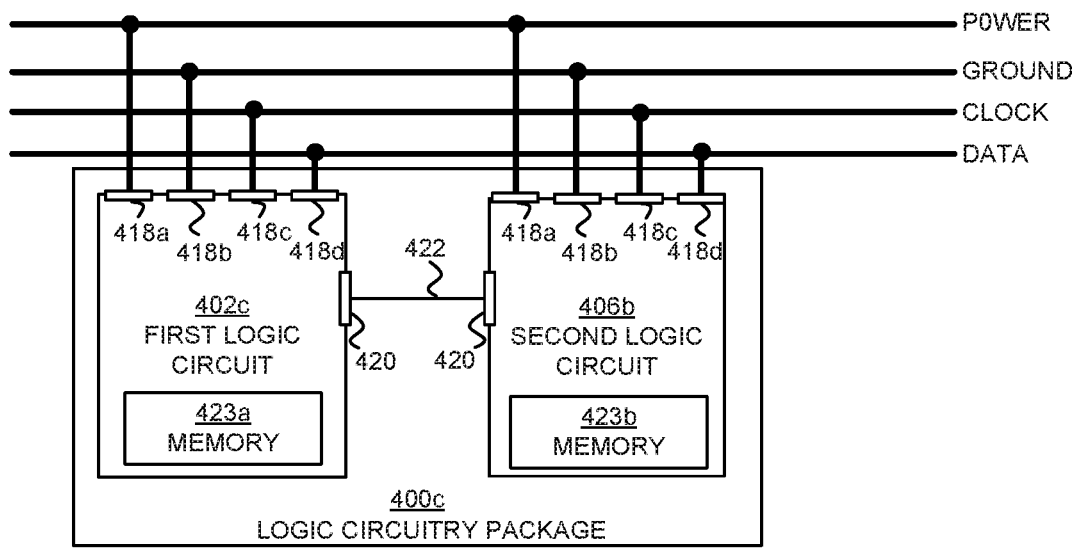

FIG. 4C illustrates an example of how a first logic circuit 402c and a second logic circuit 406b of a logic circuitry package 400c, which may have any of the attributes of the circuits/packages described above, may connect to an I2C bus and to each other. As is shown in the Figure, each of the circuits 402c, 406b has four pads (or pins) 418a-418d connecting to the Power, Ground, Clock, and Data lines of an I2C bus. In another example, four common connection pads are used to connect both logic circuits 402c, 406b to four corresponding connection pads of the print apparatus controller interface. It is noted that in some examples, instead of four connection pads, there may be fewer connection pads. For example, power may be harvested from the clock pad; an internal clock may be provided; or the package could be grounded through another ground circuit; so that, one or more of the pads may be omitted or made redundant. Hence, in different examples, the package could use only two or three interface pads and/or could include "dummy" pads.

Each of the circuits 402c, 406b has a contact pin 420, which are connected by a common signal line 422. The contact pin 420 of the second circuit serves as an enablement contact thereof.

In this example, each of the first logic circuit 402c and the second logic circuit 406b include a memory 423a, 423b. The memory 423a of the first logic circuit 402c stores information including cryptographic values (for example, a cryptographic key and/or a seed value from which a key may be derived) and identification data and/or status data of the associated replaceable print apparatus component. In some examples, the memory 423a may store data representing characteristics of the print material, for example, any part, or any combination of its type, color, color map, recipe, batch number, age, etc. The first logic circuit 402c may be, or function as, a microcontroller or secure microcontroller.

In this example, memory 423b of the second logic circuit 406b includes a programmable address register to contain an initial address of the second logic circuit 406b when the second logic circuit 406b is first enabled and to subsequently contain a new (temporary) second address (in some examples in a volatile manner) after that new second address has been communicated by the print apparatus. The new, e.g., temporary, second address may be programmed into the second address register after the second logic circuit 406b is enabled, and may be effectively erased or replaced at the end of an enablement period. In some examples, the memory 423b may further include programmable registers to store any, or any combination of a read/write history data, cell (e.g., resistor or sensor) count data, Analog to Digital converter data (ADC and/or DAC), and a clock count, in a volatile or non-volatile manner. The memory 423b may also receive and/or store calibration parameters, such as offset and gain parameters. Use of such data is described in greater detail below. Certain characteristics, such as cell count or ADC or DAC characteristics, could be derivable from the second logic circuit instead of being stored as separate data in the memory.

In one example, the memory 423b of the second logic circuit 406b stores any or any combination of an address, for example the second I2C address; an identification in the form of a revision ID; and the index number of the last cell (which may be the number of cells less one, as indices may start from 0), for example for each of different cell arrays or for multiple different cell arrays if they have the same number of cells.

In use of the second logic circuit 406b, in some operational states, the memory 423b of the second logic circuit 406 may store any or any combination of timer control data, which may enable a timer of the second circuit, and/or enable frequency dithering therein in the case of some timers such as ring oscillators; a dither control data value (to indicate a dither direction and/or value); and a timer sample test trigger value (to trigger a test of the timer by sampling the timer relative to clock cycles measureable by the second logic circuit 406b).

While the memories 423a, 423b are shown as separate memories here, they could be combined as a shared memory resource, or divided in some other way. The memories 423a, 423b may include a single or multiple memory devices, and may include any or any combination of volatile memory (e.g., DRAM, SRAM, registers, etc.) and non-volatile memory (e.g., ROM, EEPROM, Flash, EPROM, memristor, etc.).

While one package 400c is shown in FIG. 4C, there may be a plurality of packages with a similar or a different configuration attached to the bus.

Figure 4D:
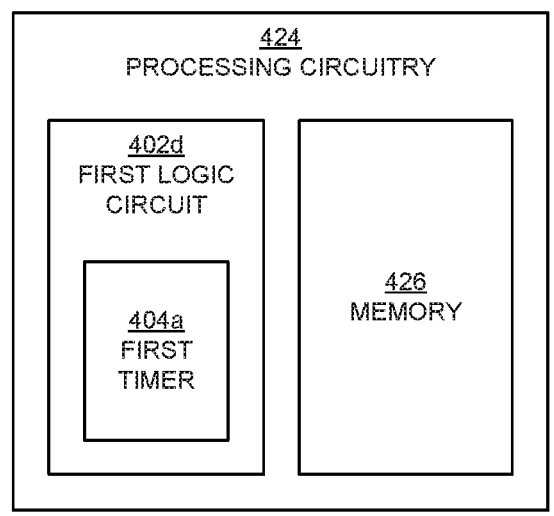

FIG. 4D illustrates an example of processing circuitry 424 which is for use with a print material container. For example, the processing circuitry 424 may be affixed or integral thereto. As already mentioned, the processing circuitry 424 may include any of the features of, or be the same as, any other logic circuitry package of this disclosure.

In this example, the processing circuitry 424 includes a memory 426 and a first logic circuit 402d which enables a read operation from memory 426. The processing circuitry 424 is accessible via an interface bus of a print apparatus in which the print material container is installed and is associated with a first address and at least one second address. The bus may be an I2C bus. The first address may be an I2C address of the first logic circuit 402d. The first logic circuit 402d may have any of the attributes of the other examples circuits/packages described in this disclosure.

The first logic circuit 402d is adapted to participate in authentication of the print materials container by a print apparatus in which the container is installed. For example, this may include a cryptographic process such as any kind of cryptographically authenticated communication or message exchange, for example based on a key stored in the memory 426, and which can be used in conjunction with information stored in the printer. In some examples, a printer may store a version of a key which is compatible with a number of different print material containers to provide the basis of a 'shared secret'. In some examples, authentication of a print material container may be carried out based on such a shared secret. In some examples, the first logic circuit 402d may participate in a message to derive a session key with the print apparatus and messages may be signed using a message authentication code based on such a session key. Examples of logic circuits configured to cryptographically authenticate messages in accordance with this paragraph are described in US patent publication No. 9619663.

In some examples, the memory 426 may store data including: identification data and read/write history data. In some examples, the memory 426 further includes cell count data (e.g., sensor count data) and clock count data. Clock count data may indicate a clock speed of a first and/or second timer 404a, 404b (i.e., a timer associated with the first logic circuit or the second logic circuit). In some examples, at least a portion of the memory 426 is associated with functions of a second logic circuit, such as a second logic circuit 406a as described in relation to FIG. 4B above. In some examples, at least a portion of the data stored in the memory 426 is to be communicated in response to commands received via the second address, for example the earlier mentioned initial or reconfigured/temporary second address. In some examples, the memory 426 includes a programmable address register or memory field to store a second address of the processing circuitry (in some examples in a volatile manner). The first logic circuit 402d may enable read operation from the memory 426 and/or may perform processing tasks.

The memory 426 may, for example, include data representing characteristics of the print material, for example any or any combination of its type, color, batch number, age, etc. The memory 426 may, for example, include data to be communicated in response to commands received via the first address. The processing circuitry may include a first logic circuit to enable read operations from the memory and perform processing tasks.

In some examples, the processing circuitry 424 is configured such that, following receipt of the first command indicative of a task and a first time period sent to the first logic circuit 402d via the first address, the processing circuitry 424 is accessible by at least one second address for a duration of the first time period. Alternatively or additionally, the processing circuitry 424 may be configured such that in response to a first command indicative of a task and a first time period sent to the first logic circuit 402d addressed using the first address, the processing circuitry 424 is to disregard (e.g., 'ignore' or 'not respond to') I2C traffic sent to the first address for substantially the duration of the time period as measured by a timer of the processing circuitry 424 (for example a timer 404a, 404b as described above). In some examples, the processing circuitry may additionally perform a task, which may be the task specified in the first command. The term 'disregard' or 'ignore' as used herein with respect to data sent on the bus may include any or any combination of not receiving (in some examples, not reading the data into a memory), not acting upon (for example, not following a command or instruction) and/or not responding (i.e., not providing an acknowledgement, and/or not responding with requested data).

The processing circuitry 424 may have any of the attributes of the logic circuitry packages 400 described herein. In particular, the processing circuitry 424 may further include a second logic circuit wherein the second logic circuit is accessible via the second address. In some examples, the second logic circuit may include at least one sensor which is readable by a print apparatus in which the print material container is installed via the second address. In some examples, such a sensor may include a print materials level sensor. In an alternative example, the processing circuitry 424 may include a single, integral logic circuit, and one or more sensors of one or more types.

Figure 4E:
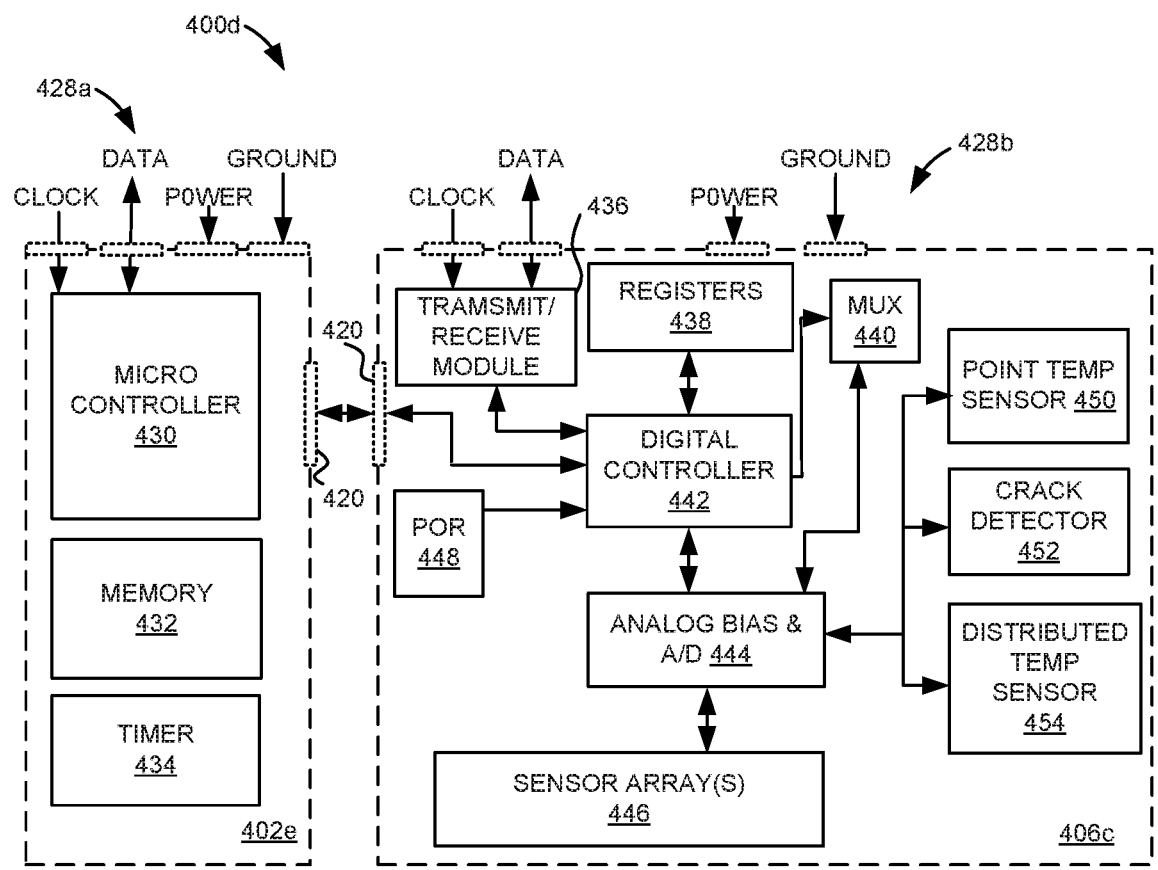

FIG. 4E illustrates another example of a first logic circuit 402e and second logic circuit 406c of a logic circuitry package 400d, which may have any of the attributes of the circuits/packages of the same names described herein, which may connect to an I2C bus via respective interfaces 428a, 428b and to each other. In one example the respective interfaces 428a, 428b are connected to the same contact pad array, with only one data pad for both logic circuits 402e, 406c, connected to the same serial I2C bus. In other words, in some examples, communications addressed to the first and the second address are received via the same data pad.

In this example, the first logic circuit 402e includes a microcontroller 430, a memory 432, and a timer 434. The microcontroller 430 may be a secure microcontroller or customized integrated circuitry adapted to function as a microcontroller, secure or non-secure.

In this example, the second logic circuit 406c includes a transmit/receive module 436, which receives a clock signal and a data signal from a bus to which the package 400d is connected, data registers 438, a multiplexer 440, a digital controller 442, an analog bias and analog to digital converter 444, at least one sensor or cell array 446 (which may in some examples include a level sensor with one or multiple arrays of resistor elements), and a power-on reset (POR) device 448. The POR device 448 may be used to allow operation of the second logic circuit 406c without use of a contact pin 420.

The analog bias and analog to digital converter 444 receives readings from the sensor array(s) 446 and from additional sensors 450, 452, 454. For example, a current may be provided to a sensing resistor and the resultant voltage may be converted to a digital value. That digital value may be stored in a register and read out (i.e., transmitted as serial data bits, or as a bitstream) over the I2C bus. The analog to digital converter 444 may utilize parameters, for example, gain and/or offset parameters, which may be stored in registers.

In this example, there are different additional single sensors, including for example at least one of a point temperature sensor 450, a crack detector 452, and/or a distributed temperature sensor 454. The point temperature sensor 450 (e.g., a thermal diode) may sense the temperature of print material (e.g., fluid) when the print material level is above the location of the point temperature sensor. The point temperature sensor 450 may sense the temperature of the air inside the component when the print material level is below the location of the point temperature sensor. In many cases, the air temperature and print material temperature will be the same. If the component has recently been transported, however, there is a chance that the component may be frozen. The air volume will warm faster than the print material volume once exposed to warmer ambient conditions. Before determining if the print material inside a component is frozen, a print system may first reference the last known print material level stored in a memory to ensure the print material level is sufficiently near or above the point temperature sensor to achieve an accurate measurement dependent on thermal conduction between the print material and the logic circuitry package where the point temperature sensor is located. In some examples, the point temperature sensor may only be read upon new component installation. The crack detector 452 may sense a structural integrity of a die on which the logic circuitry is provided. The distributed temperature sensor 454 (e.g., a temperature sensitive resistor) may sense the average temperature of print material and/or air over its length. The point and/or distributed temperature sensor may be different than the temperature sensor cells of the sensor 410 intended for fluid level sensing.

Figure 5A:
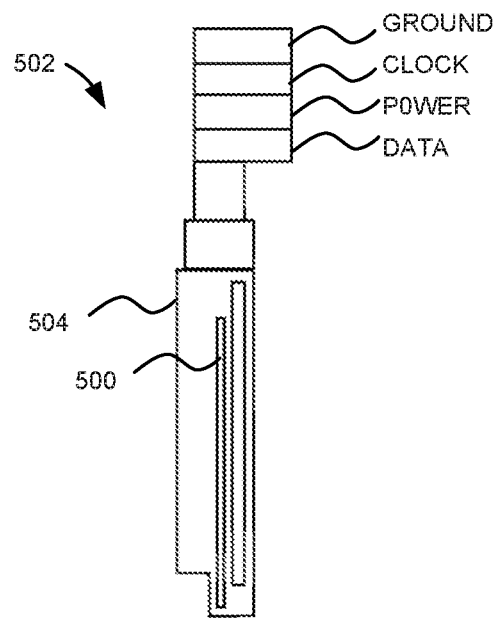
FIG. 5A illustrates one example arrangement of a fluid level sensor.

FIG. 5A illustrates an example of a possible practical arrangement of a second logic circuit embodied by a sensor assembly 500 in association with a circuitry package 502. The sensor assembly 500 may include a thin film stack and include at least one sensor array such as a fluid level sensor array. The arrangement has a high length to width aspect ratio (e.g., as measured along a substrate surface), for example being around 0.2 mm in width, for example less than 1 mm, 0.5 mm, or 0.3 mm, and around 20 mm in length, for example more than 10 mm, leading to length to width aspect ratios equal to or above approximately 20:1, 40:1, 60:1, 80:1, or 100:1. In an installed condition the length may be measured along the height. The logic circuit in this example may have a thickness of less than 1 mm, less than 0.5 mm, or less than 0.3 mm, as measured between the bottom of the (e.g., silicon) substrate and the opposite outer surface. These dimensions mean that the individual cells or sensors are small. The sensor assembly 500 may be provided on a relatively rigid carrier 504, which in this example also carries Ground, Clock, Power and Data I2C bus contacts.

Figure 5B:
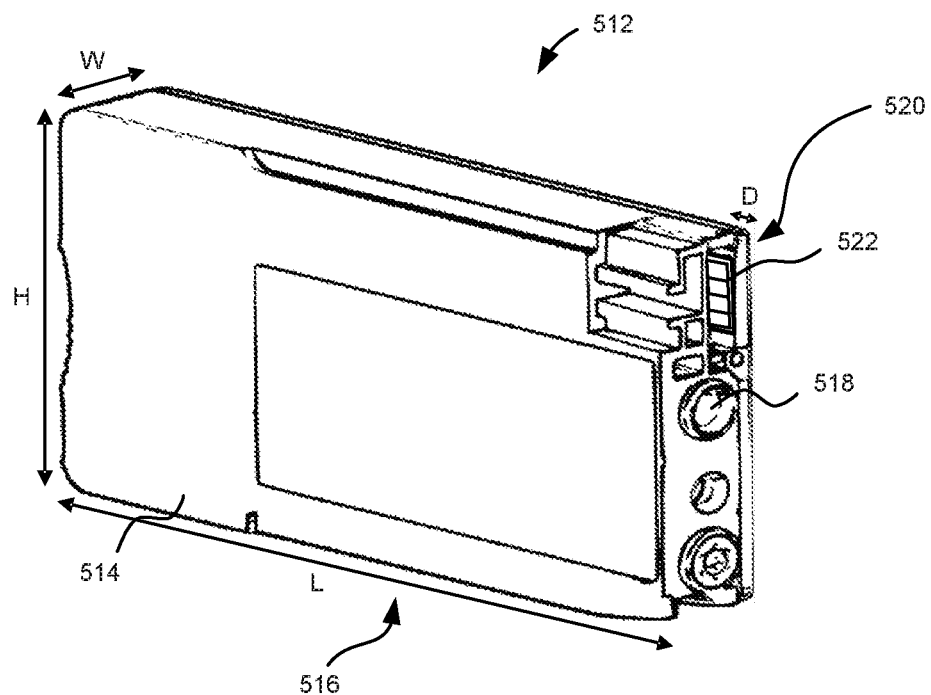
FIG. 5B illustrates a perspective view of one example of a print cartridge.

FIG. 5B illustrates a perspective view of a print cartridge 512 including a logic circuitry package of any of the examples of this disclosure. The print cartridge 512 has a housing 514 that has a width W less than its height H and that has a length L or depth that is greater than the height H. A print liquid output 516 (in this example, a print agent outlet provided on the underside of the cartridge 512), an air input 518 and a recess 520 are provided in a front face of the cartridge 512. The recess 520 extends across the top of the cartridge 512 and I2C bus contacts (i.e., pads) 522 of a logic circuitry package 502 (for example, a logic circuitry package 400a-400d as described above) are provided at a side of the recess 520 against the inner wall of the side wall of the housing 514 adjacent the top and front of the housing 514. In this example, the data contact is the lowest of the contacts 522. In this example, the logic circuitry package 502 is provided against the inner side of the side wall. In some examples, the logic circuitry package 502 includes a sensor assembly as shown in FIG. 5A.

In other examples, a replaceable print apparatus component includes a logic circuitry package of any of the examples described herein, wherein the component further includes a volume of liquid. The component may have a height H that is greater than a width W and a length L that is greater than the height, the width extending between two sides. Interface pads of the package may be provided at the inner side of one of the sides facing a cut-out for a data interconnect to be inserted, the interface pads extending along a height direction near the top and front of the component, and the data pad being the bottom-most of the interface pads, the liquid and air interface of the component being provided at the front on the same vertical reference axis parallel to the height H direction wherein the vertical axis is parallel to and distanced from the axis that intersects the interface pads (i.e., the pads are partially inset from the edge by a distance D). The rest of the logic circuitry package may also be provided against the inner side.

It will be appreciated that placing logic circuitry within a print material cartridge may create challenges for the reliability of the cartridge due to the risks that electrical shorts or damage can occur to the logic circuitry during shipping and user handling, or over the life of the product.

A damaged sensor may provide inaccurate measurements, and result in inappropriate decisions by a print apparatus when evaluating the measurements. Therefore, a method may be used to verify that communications with the logic circuitry based on a specific communication sequence provide expected results. This may validate the operational health of the logic circuitry.

Figure 6:
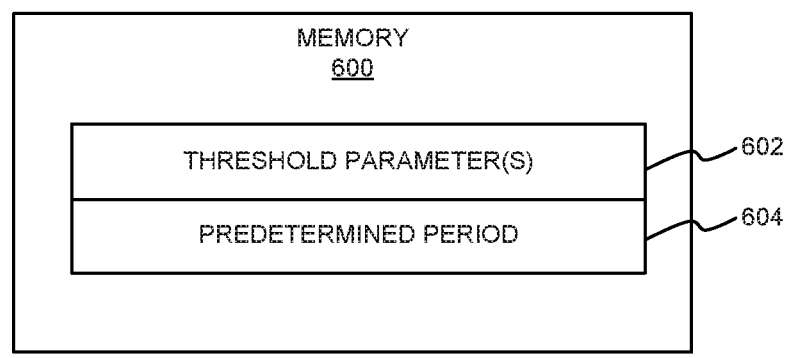
FIG. 6 illustrates one example of a memory of a logic circuitry package.

FIG. 6 illustrates one example of a memory 600 of a logic circuitry package, which may provide a part of memory 423a of logic circuitry package 400c (FIG. 4C), memory 426 of processing circuitry 424 (FIG. 4D), or memory 432 of logic circuitry package 400d (FIG. 4E). Memory 600 may store, in addition to other values previously described, threshold parameter(s) 602, a predetermined period 604, and/or other suitable parameters for operating a logic circuitry package. In some examples, each of the values or a subset of the values stored in memory 600 may be digitally signed.

As will be described in more detail below, the threshold parameter(s) 602 may be used to determine the print material level within a reservoir of a replaceable print apparatus component. The threshold parameter(s) 602 may include a first value (e.g., −20) when the print material level is above a predetermined level (e.g., the sensor assembly is fully in contact with the print material) and a second value (e.g., −11) when the print material is below the predetermined level (e.g., the sensor assembly is partially in contact with the print material and partially in contact with air). The threshold parameter(s) may be stored as a count value(s). The predetermined period 604 may indicate the amount of time to enable (i.e., activate) a heater cell in response to a corresponding request. In one example, the predetermined period is within a range between about 20 and 250 microseconds. The predetermined period 604 may be stored as a count value equal to the number of cycles of a clock signal of the logic circuitry package equivalent to the predetermined period.

Figure 7:
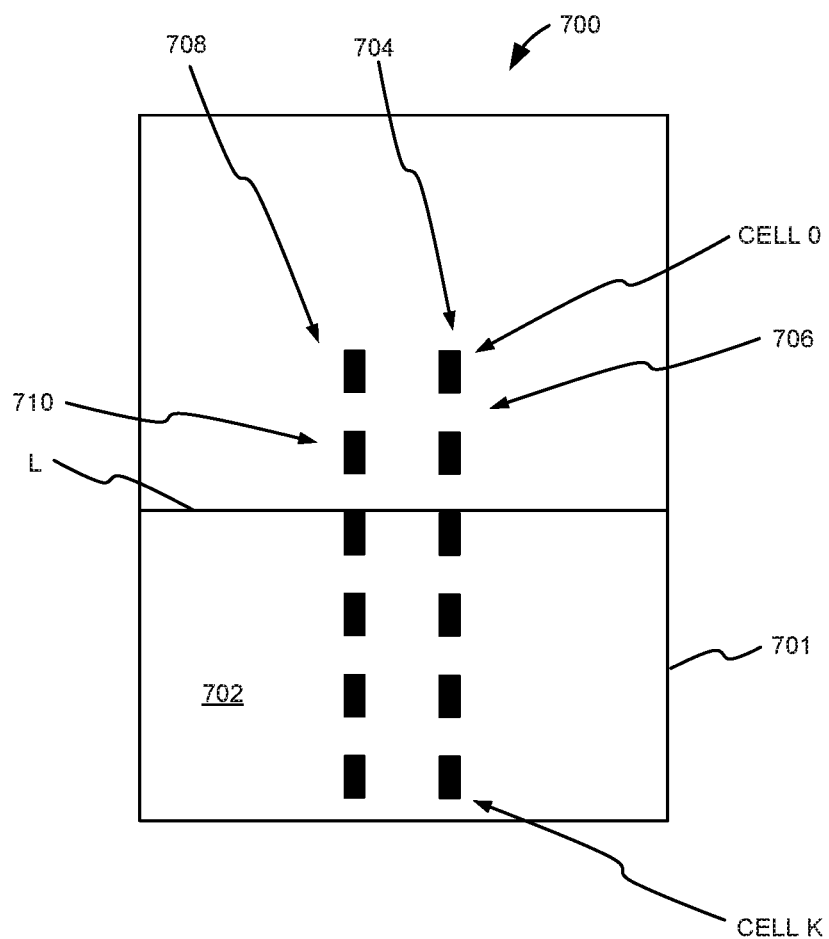
FIG. 7 illustrates one example of a print material level sensor.

FIG. 7 illustrates one example of a print material level sensor of a replaceable print component 700 including a print material 702, a sensor cell array 704 including a plurality of sensor cells 706, and a heater array 708 including a plurality of heaters cells 710. The heater cells 710 may be arranged alongside the sensor cells 706. At installation, the print apparatus component 700 is filled to a point above the sensor cell array 704 so that the sensor cell array 704 is completely covered by the print material 702. In such state, in one example, all sensor cells 706 of the sensor cell array 704 return first, relatively low count values when the corresponding heater cells 710 are enabled. Then, after some exhaustion of print material 702 (which is illustrated in FIG. 7), when the print material level L drops to a point below the highest sensor cell 0 of the sensor cell array 704, a higher sub-set of cells (including highest cell 0) outputs second, higher count values when the corresponding heater cells 710 are enabled because they are not covered by the print material, and hence, not cooled, while a lower sub-set of cells (including lowest cell k) may output first, lower count values, as will be further described below with reference to FIG. 8B. When the print material 702 has substantially exhausted, i.e., the print material level has dropped below the lowest cell k, all sensor cells 706 may return second, relatively high count values.

In another example, the highest cell 0 may be calibrated to output a target value (e.g., 200 counts) prior to any sensor readings to ensure all sensors readings will be within a valid range. In this case, if cell 0 is completely covered by the print material 702 when calibrated to the target value, the lower cells including the lowest cell k may output count values close to the output count value of cell 0. If cell 0 is not covered by the print material when calibrated to the target value, a higher sub-set of cells not covered by the print material (including the highest cell 0) will output relatively higher count values close to the output count value of cell 0, while a lower sub-set of cells covered by the print material (including the lowest cell k) may output relatively lower count values compared to the output count value of cell 0. Thus, even when cell 0 transitions from covered by the print material to not covered by the print material, the cell 0 output count may remain constant because a new calibration value is used, but cells 1-k which are still covered by the print material will show a large drop in output counts because they are relative to the new calibration point for cell 0.

The temperature sensor cell array 704 may include over 20, over 40, over 60, over 80, over 100, or over 120 cells (in one example, 126 cells). The cells may include thin film elements on a thin film substrate, as part of thin film circuitry. In one example, the sensor cells 706 include resistors. In one example, each temperature sensing resistor has a serpentine shape, for example to increase its length over a small area.

At a first usage of a filled replaceable print apparatus component (e.g., first customer installation), a temperature sensor cell response in heated and wet condition may be determined for calibration, because all cells may be covered by print liquid. Since it is known that the output of a dry sensor cell is higher, the calibrated output count value for the wet cells should be at a certain minimum distance from the highest output count value of the output count value operational range to allow for margin for later outputs of the dry cells.

The calibration logic may set any of the heating power, heating time, sense time, offset function, amplifier function, and/or analog to digital and digital to analog conversion functions so that the output count values are within the operational range, at a sufficient distance from the highest output count value to allow for margin for dry and heated readings, and/or at a sufficient distance from the lowest output count value to allow for margin for (wet or dry) unheated readings. The calibration parameters may be adjusted until the logic circuit returns an output count value, first, within a wider count value range at a distance from the highest and lowest output count values, respectively, (e.g., to avoid clipping) and, second, in a narrower sub-range, for example having at least 50 or 100 counts from the highest output count value (e.g., at least 10% or at least 20% of the range distance from the ends of the range) if the output count value range is between 0 and 255, for example between 60 and 200 counts. The output count value range is set so that there is margin in the count value range for a lower output count value range for unheated cells, for example below the 60 or 100 counts, while still being able to determine the difference between dry and wet cells.

After setting the operational calibration parameters, the print material level may be derived by detecting a step change as described below with reference to FIGS. 8A-9B in the output count values of the series of sensor cells 706 of the sensor array 704. For example, the logic circuit is configured to, in response to identifying a second class parameter associated with the print material (i.e., temperature) sensor class, and subsequently, a series of varying sub-class parameters and read requests, where the series is received at various points in time, output (a) first count values associated with the sub-class parameters, and, (b) at a later point in time when more print liquid in a replaceable print component has been extracted, second count values higher than the first count values associated with the same sub-class parameters. The latter second and first count values may each be output in different read cycles in separate time durations of second address enablement. The latter second and first count values may be separated by a step change, in a diagram plotting on one axis the sub-class numbers and another axis the output count values (per FIG. 8B). The first count values are all at least a step change lower than the second count values. At least one third count value may be provided in the step change.

For example, in response to receiving the second class parameter associated with the print material sensor class, and operational calibration parameters for that class, and subsequently, a series of sub-class selections and respective read requests, the logic circuitry package may output, during depletion of the associated liquid reservoir 701, (i) at a first point in time, first relatively low count values for all sub-class selections of the series, (ii) at a second point in time after depletion, second relatively high count values for a sub-set of the series of sub-class selections and first relatively low count values for remaining sub-class selections of the series, and (iii) at a third point in time after more depletion (e.g., complete or near exhaustion), second relatively high count values for all sub-class selections of the series. The respective first, second and third condition (as indicated by roman numerals i, ii and iii, respectively) are associated with a measure of depletion of print liquid 702 during the lifetime of a replaceable print component 700. The sub-class IDs corresponding to the step change can be determined which in turn allows for determining the print material level. In use, the respective transitions between the first, second and third condition (i, ii, iii) are accompanied by a change in a count field in a memory of the package (e.g., memory 432 of FIG. 4E), which count field is associated with a print material level by a print apparatus and may be regularly updated by the print apparatus between or during print jobs, for example based on printed drop count or printed pages count.

In certain examples, the sensor circuit 704, 708 may extend from near a gravitational bottom upwards, at least in a normal operational orientation, but not reach the complete height of the reservoir 701. Hence, the logic circuit is configured to generate first, relatively low count values during a substantial part of the lifetime, per roman i above. In certain alternative embodiments, the logic circuit may return only first count values in response to the second class parameters and subsequent sub-class parameters and certain operational calibration parameters, at least until a value in the print material level field reaches a value that the print apparatus logic circuit associated with a level that is above the sensor cells 706.

The logic circuitry package may include a "Trust" metric. This Trust metric represents how often the print material level sensor and algorithm correctly determine the print material level of a component versus how often the incorrect print material level is determined. If too many incorrect print material level determinations are made, the Trust score decreases, and the print apparatus component may be rejected by a printer in the field. The logic circuitry package should perform with a high Trust score by avoiding false triggers.

During a print job, the scanning carriage motion may disturb the print material level in the print apparatus component. The scanning motion may strand residual ink on the print material level sensing die, generate air bubbles, splash droplets of ink onto the sensor, create froth inside the reservoir, etc. Each of these may cause the sensor to appear wet at a given location during the print material level measurement, resulting in what appears to be multiple ink levels within the component. This may be confusing to a print material level algorithm, and result in incorrect determination of the ink level, negatively affecting the Trust score. Accordingly, the process for print material level measurement described in more detail below with reference to FIGS. 8A-9B may be used to reduce incorrect determinations of the ink level.

Figure 8A:
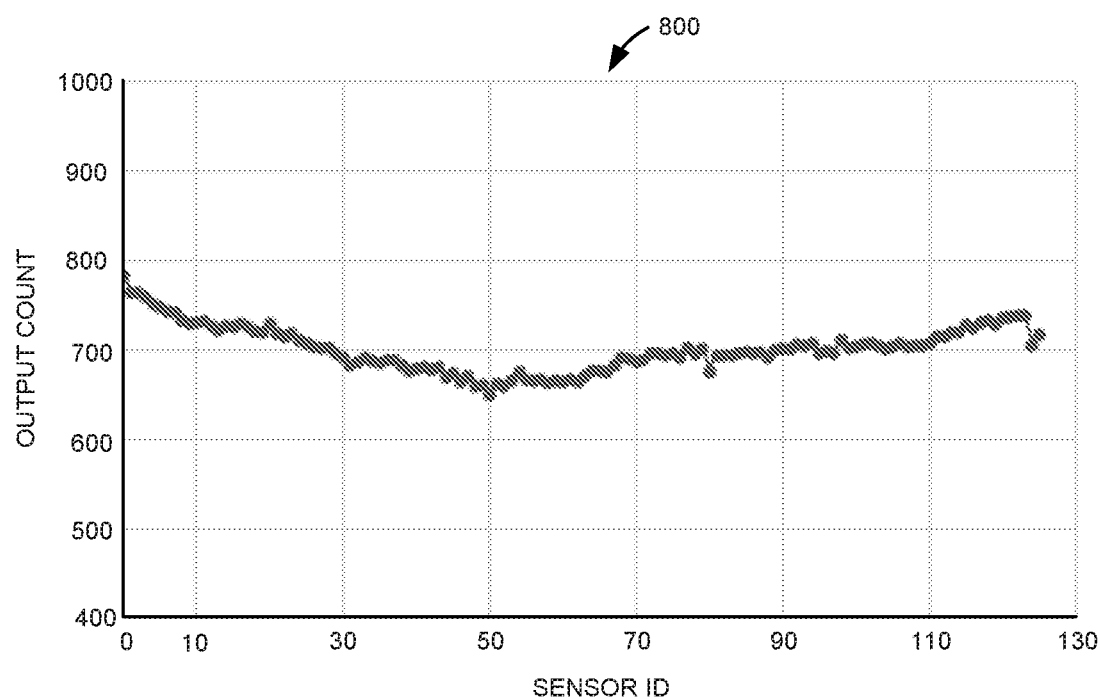
FIG. 8A is a chart illustrating one example of temperature sensor cell readings with heater cells disabled.

FIG. 8A is a chart 800 illustrating one example of temperature sensor cell (e.g., 414a-414f of FIG. 4B or 706 of FIG. 7) readings with heater cells (e.g., 416a-416f or 710) disabled. Chart 800 includes output counts on the vertical axis and sensor IDs (or sub-class IDs) on the horizontal axis. In response to a request corresponding to each sensor ID with the heater cells disabled, an output count is generated (e.g., via analog bias and analog to digital converter 444 of FIG. 4E) corresponding to the analog signal from each associated sensor cell. The output counts for the sensor cells in chart 800 are not related to the print material level since heating is disabled. In this example, each sensor cell is read five times and the output counts for each of the five readings are added together. For example, the output count of about 790 for the sensor cell addressed by sensor ID 0 is the sum of five output count readings (e.g., 159, 157, 157, 159, and 158). In other examples, each sensor cell may be read one time, two times, three times, four times, or more than five times. Reading each sensor cell multiple times reduces noise and improves the signal quality. The output counts with the heater cells disabled provide a base or reference reading for each sensor cell, such that sensor cell to sensor cell mismatch as indicated by the different output counts illustrated in FIG. 8A for the different sensor IDs can be filtered out, as will be described below with reference to FIG. 9A.

Figure 8B:
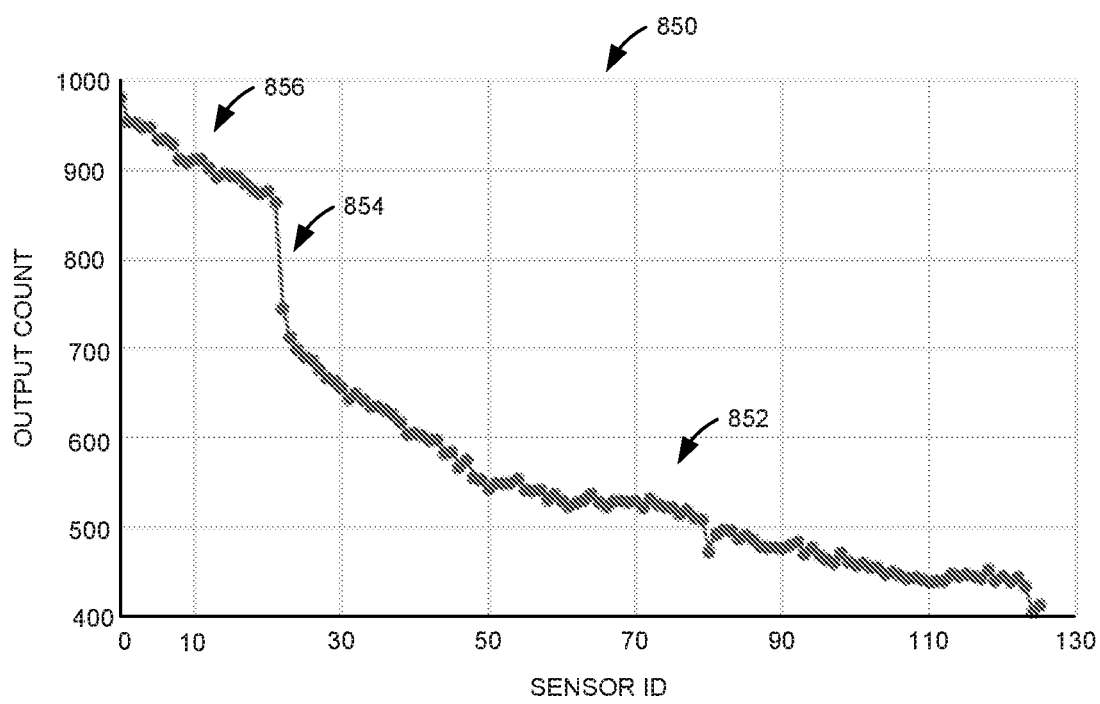
FIG. 8B is a chart illustrating one example of temperature sensor cell readings with the corresponding heater cells enabled.

FIG. 8B is a chart 850 illustrating one example of temperature sensor cell (e.g., 414a-414f of FIG. 4B or 706 of FIG. 7) readings with the corresponding heater cells (e.g., 416a-416f or 710) enabled. Chart 850 includes output counts on the vertical axis and sensor IDs (or sub-class IDs) on the horizontal axis. In response to a request corresponding to each sensor ID with the corresponding heater cell enabled, an output count is generated corresponding to the analog signal from each associated sensor cell subsequent to a heat pulse from the corresponding heater cell. In this example, each sensor cell is read five times subsequent to a corresponding heat pulse and the output counts for each of the five readings are added together. In other examples, each sensor cell may be read one time, two times, three times, four times, or more than five times. In any case, however, the number of readings with the corresponding heater cells enabled should equal the number of reading with the heaters cells disabled.

In this example, chart 850 includes a first subset of output counts as indicated 852 (e.g., for sensor IDs between about 24 and 126), a step change as indicated at 854 (e.g., for sensor IDs between about 21 and 23), and a second subset of output counts as indicated at 856 (e.g., for sensor IDs between about 0 and 20). The output counts of the first subset 852 indicate sensor cells that are submerged in print material, while the output counts of the second subset 856 indicate sensor cells that are exposed to air. The step change 854 indicates the sensor cells located at the print material level. For example, referring back to FIG. 7, the second subset 856 of output counts may correspond to sensor cell 0 to the sensor cell just above the print material level L, while the first subset 852 of output counts may correspond to the sensor cell just below the print material level L down to sensor cell k. The step change 854 may correspond to the sensor cell(s) at or substantially near to the print material level L. In one example, the slope of the subsets 852, 856, representing a steady decrease of output count values of subsequent cells down the cell array, may be caused by parasitic resistance.

Figure 9A:
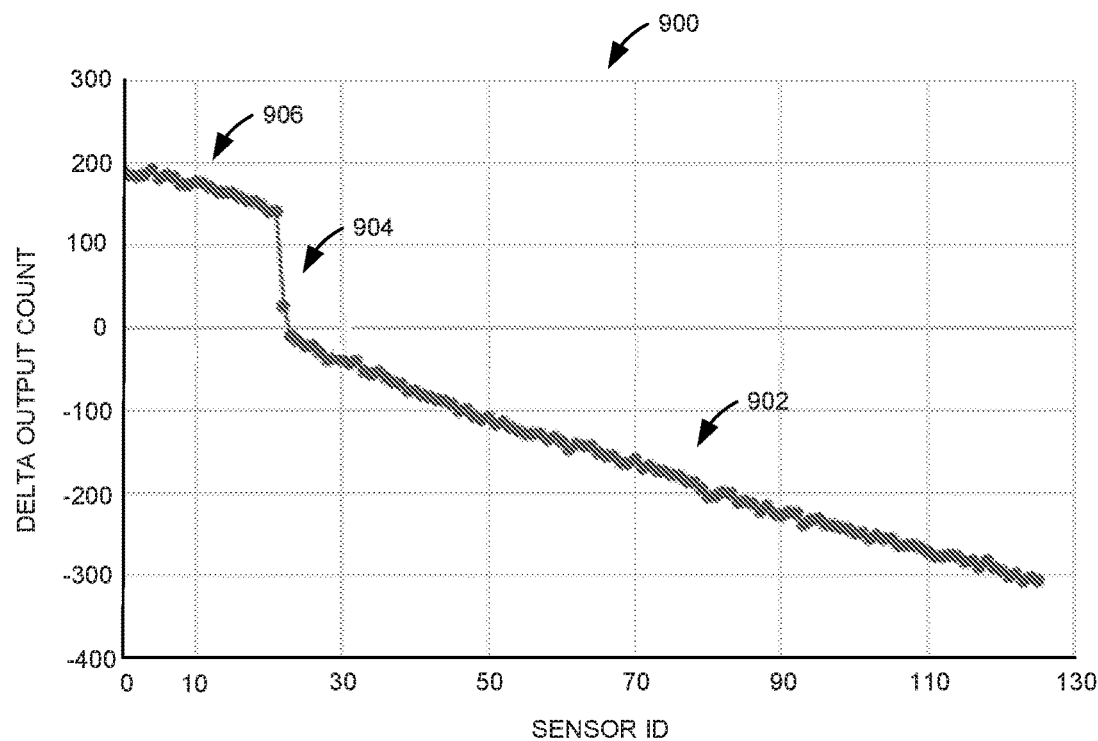
FIG. 9A is a chart illustrating one example of the difference between the temperature sensor cell readings with the corresponding heater cells enabled and the temperature sensor cell readings with the heater cells disabled.

FIG. 9A is a chart 900 illustrating the difference between the output counts with the corresponding heater cells enabled (FIG. 8B) and the output counts with the heater cells disabled (FIG. 8A) for each sensor ID. Chart 900 includes delta output counts on the vertical axis and sensor IDs (or sub-class IDs) on the horizontal axis. Chart 900 includes the output count from chart 850 of FIG. 8B minus the output count from chart 800 of FIG. 8A for each sensor ID, respectively. The delta counts eliminate the sensor cell to sensor cell mismatch that is present in the output counts of both charts 800 and 850. By filtering out the sensor cell to sensor cell mismatch, incorrect determinations of the print material level may be reduced. As illustrated in FIG. 9A, chart 900 includes a first subset of delta output counts as indicated 902 indicating sensor cells that are submerged in print material, a delta step change as indicated at 904 indicating the print material level, and a second subset of delta output counts as indicated at 906 indicating sensor cells that are exposed to air.

Figure 9B:
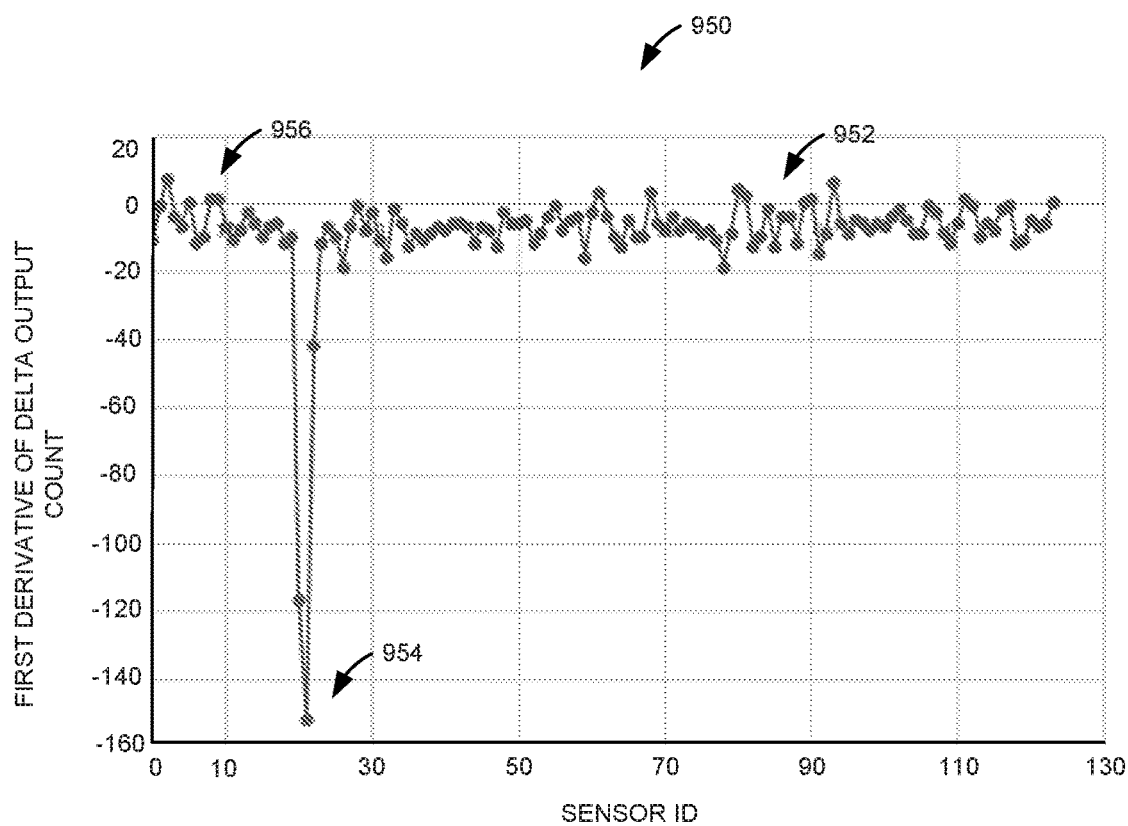
FIG. 9B is a chart illustrating one example of the first derivative of the values of the chart of FIG. 9A.

FIG. 9B is a chart 950 illustrating the first derivative of the delta output counts of chart 900 of FIG. 9A. The first derivative subtracts each delta output count for a selected sensor cell from the delta output count for the sensor cell two sensor cells away (e.g., sensor ID+2) from the selected sensor cell. By using sensor cells two locations apart, the magnitude of transitions that occur across more than one sensor cell is improved. In other examples, the first derivative may use sensor cells one location apart or more than two locations apart. The first derivative results in close to zero output counts (e.g., within a range between about −20 to 10) as indicated at 952 for the first subset 902 of output counts of chart 900. Likewise, the first derivative results in close to zero output counts as indicated at 956 for the second subset 906 of output counts of chart 900. This indicates that there is a relatively small difference between output counts for sensor cells two locations apart from each other in the first subset 902 and the second subset 906. The first derivative, however, results in a substantially low output count as indicated at 954 for the step change 904 of chart 900. This indicates that there is a relatively large difference between output counts for sensor cells two locations apart from each other in the step change 904.

A threshold parameter (e.g., 602 of FIG. 6) is compared to the first derivative of the delta output counts for each sensor ID to determine the print material level. The threshold parameter may include a first value per sensor cell reading (e.g., −20) when the print material level is above the sensor array and a second value per sensor cell reading (e.g., −11) when the print material level is below the top of the sensor array (e.g., as indicated by the value in the print material level field). The selected threshold parameter is multiplied by the number of sensor cell readings (e.g., five in this example for a first threshold parameter of −100 and a second threshold parameter of −55) and compared to the first derivative of the delta output count for each sensor ID. In this example, the first derivative of the delta output count for sensor ID 22 is less than −55 such that the print material level is determined to be at sensor cell 22. If the first derivative of the delta output count is less than the threshold parameter for more than one sensor ID (e.g., due to residual ink on the print material level sensing die, air bubbles, splashed droplets of ink on the sensor, froth inside the reservoir, etc.), the highest sensor ID (i.e., corresponding to the physically lowest sensor cell in FIG. 7) that has a first derivative less than the threshold parameter is determined to correspond to the print material level.

Figure 10A:
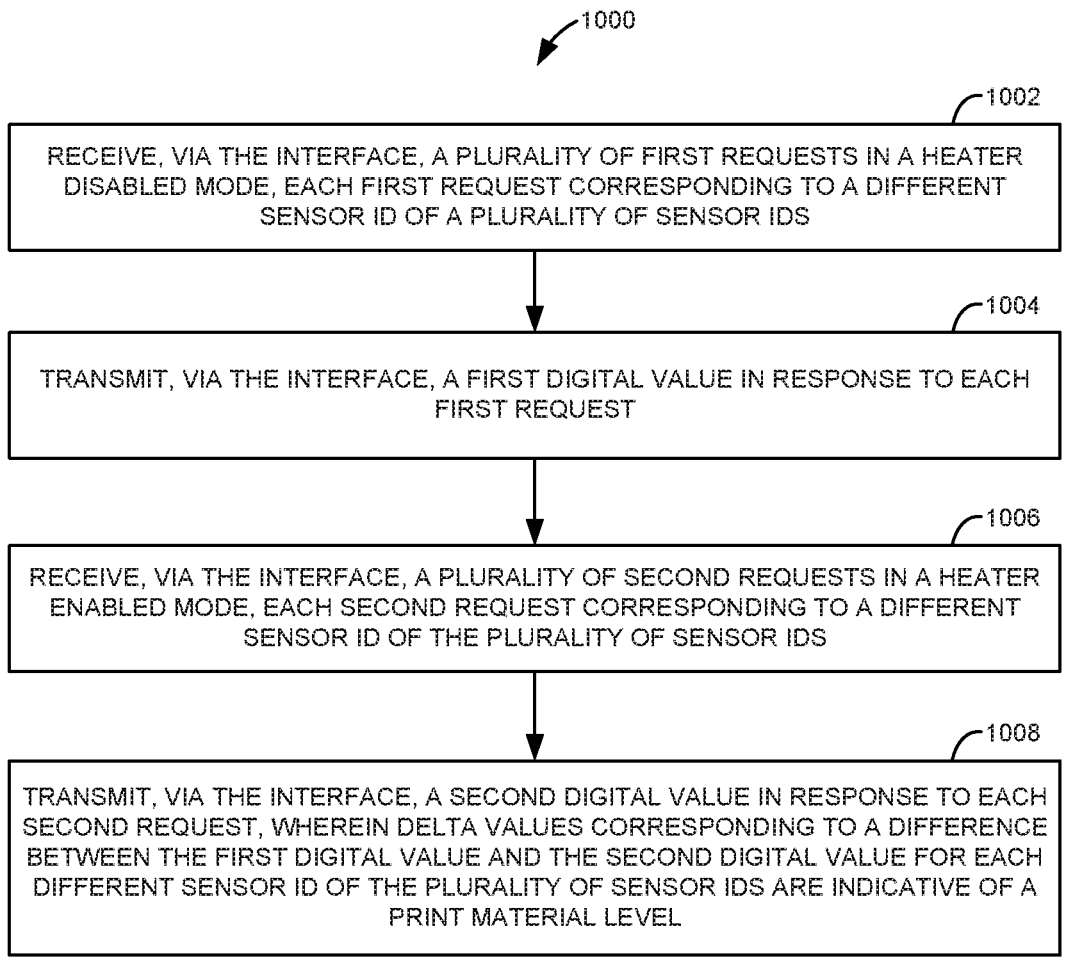
FIGS. 10A and 10B are flow diagrams illustrating example methods that may be carried out by a logic circuitry package.
Figure 10B:
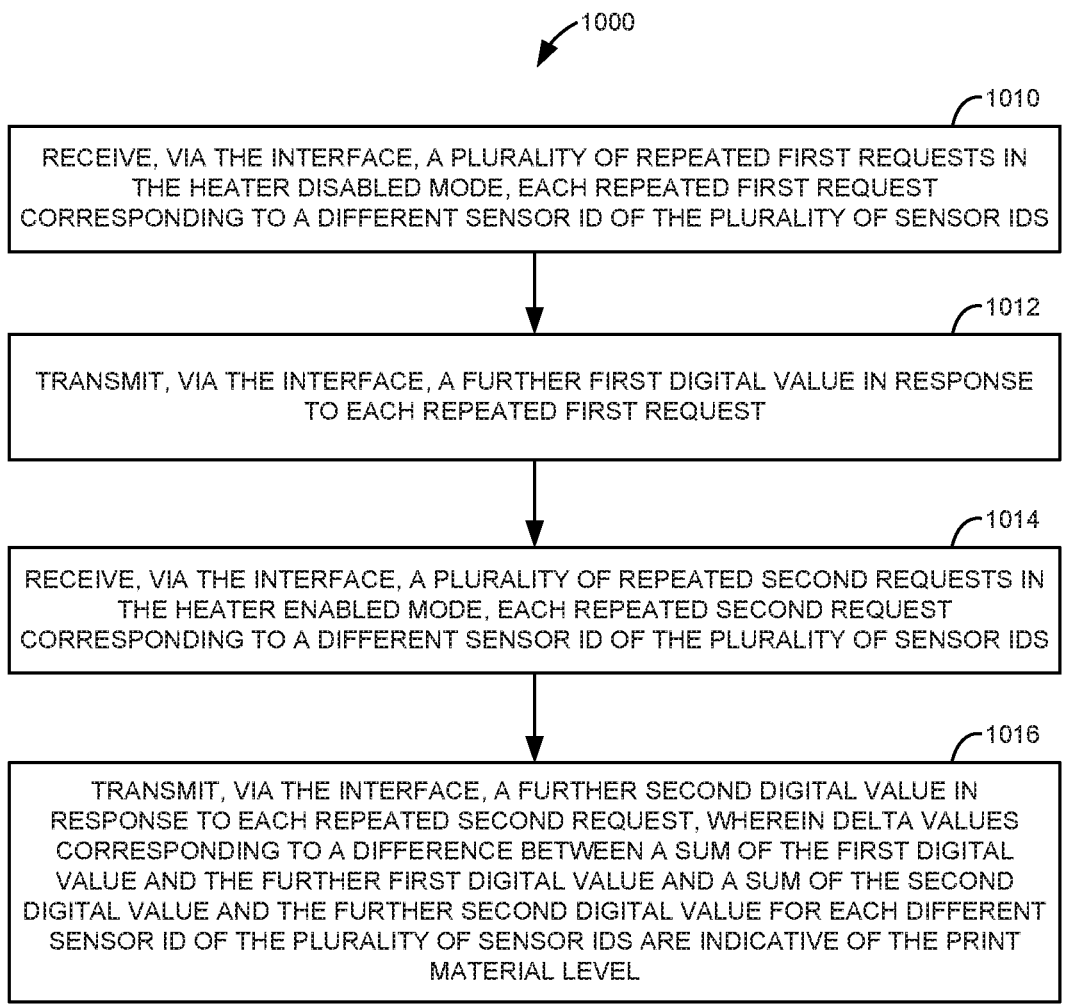

FIGS. 10A and 10B are flow diagrams illustrating example methods 1000 that may be carried out by a logic circuitry package, such as logic circuitry package 400a-400d or by processing circuitry 424. In this example, the logic circuitry package includes an interface (e.g., an I2C interface) to communicate with a print apparatus logic circuit and at least one logic circuit. As illustrated in FIG. 10A at 1002, the at least one logic circuit may receive, via the interface, a plurality of first requests in a heater disabled mode, each first request corresponding to a different sensor ID of a plurality of sensor IDs (e.g., sensor IDs corresponding to sensor cells 414a-414f of FIG. 4B or sensor cells 706 of FIG. 7). At 1004, the at least one logic circuit may transmit, via the interface, a first digital value (e.g., count) in response to each first request (e.g., see FIG. 8A). At 1006, the at least one logic circuit may receive, via the interface, a plurality of second requests in a heater enabled mode, each second request corresponding to a different sensor ID of the plurality of sensor IDs. At 1008, the at least one logic circuit may transmit, via the interface, a second digital value (e.g., count) in response to each second request (e.g., see FIG. 8B). Delta values corresponding to a difference between the first digital value and the second digital value for each different sensor ID of the plurality of sensor IDs are indicative of a print material level (e.g., see FIG. 9A).

As illustrated in FIG. 10B at 1010, the at least one logic circuit may receive, via the interface, a plurality of repeated first requests in the heater disabled mode, each repeated first request corresponding to a different sensor ID of the plurality of sensor IDs. At 1012, the at least one logic circuit may transmit, via the interface, a further first digital value in response to each repeated first request. At 1014, the at least one logic circuit may receive, via the interface, a plurality of repeated second requests in the heater enabled mode, each repeated second request corresponding to a different sensor ID of the plurality of sensor IDs. At 1016, the at least one logic circuit may transmit, via the interface, a further second digital value in response to each repeated second request. Delta values corresponding to a difference between a sum of the first digital value and the further first digital value and a sum of the second digital value and the further second digital value for each different sensor ID of the plurality of sensor IDs are indicative of the print material level (e.g., see FIGS. 8A-9A where each first request and second request is repeated five times).

In one example, a difference between a delta value for a sensor ID of the plurality of sensor IDs and a delta value for a sensor ID plus two of the plurality of sensor IDs being less than or equal to a threshold parameter indicates the print material level (e.g., see FIG. 9B). The threshold may include a first (absolute) value when the print material level is above a predetermined level (e.g., a level above the sensor array 704, 708 of FIG. 7) and a second (absolute) value less than the first value when the print material is below the predetermined level. The at least one logic circuit may include a memory (e.g., 600 of FIG. 6) storing the threshold parameter (e.g., 602).

In one example, the at least one logic circuit may receive the plurality of first requests in a sequential order of the different sensor IDs of the plurality of sensor IDs. In another example, the at least one logic circuit may receive the plurality of first requests in a random order of the different sensor IDs of the plurality of sensor IDs.

In one example, the logic circuitry package may include a sensor (e.g., 410 of FIG. 4B or 704, 708 of FIG. 7) to determine the print material level. In this case, the sensor may include a plurality of heater cells (e.g., 416a-416f or 710) and a corresponding plurality of temperature sensor cells (e.g., 414a-414f or 706). Each first digital value and each second digital value may correspond to a temperature of a temperature sensor cell corresponding to a different sensor ID of the plurality of sensor IDs. In the heater disabled mode, the at least one logic circuit may disable each heater cell of the plurality of heater cells. In the heater enabled mode, the at least one logic circuit may enable a corresponding heater cell of the plurality of heater cells for a predetermined period in response to each second request. The at least one logic circuit may transmit each second digital value in response to the predetermined period for the corresponding heater cell elapsing. The at least one logic circuit may include a memory (e.g., 600 of FIG. 6) storing the predetermined period (e.g., 604).

Figure 11:
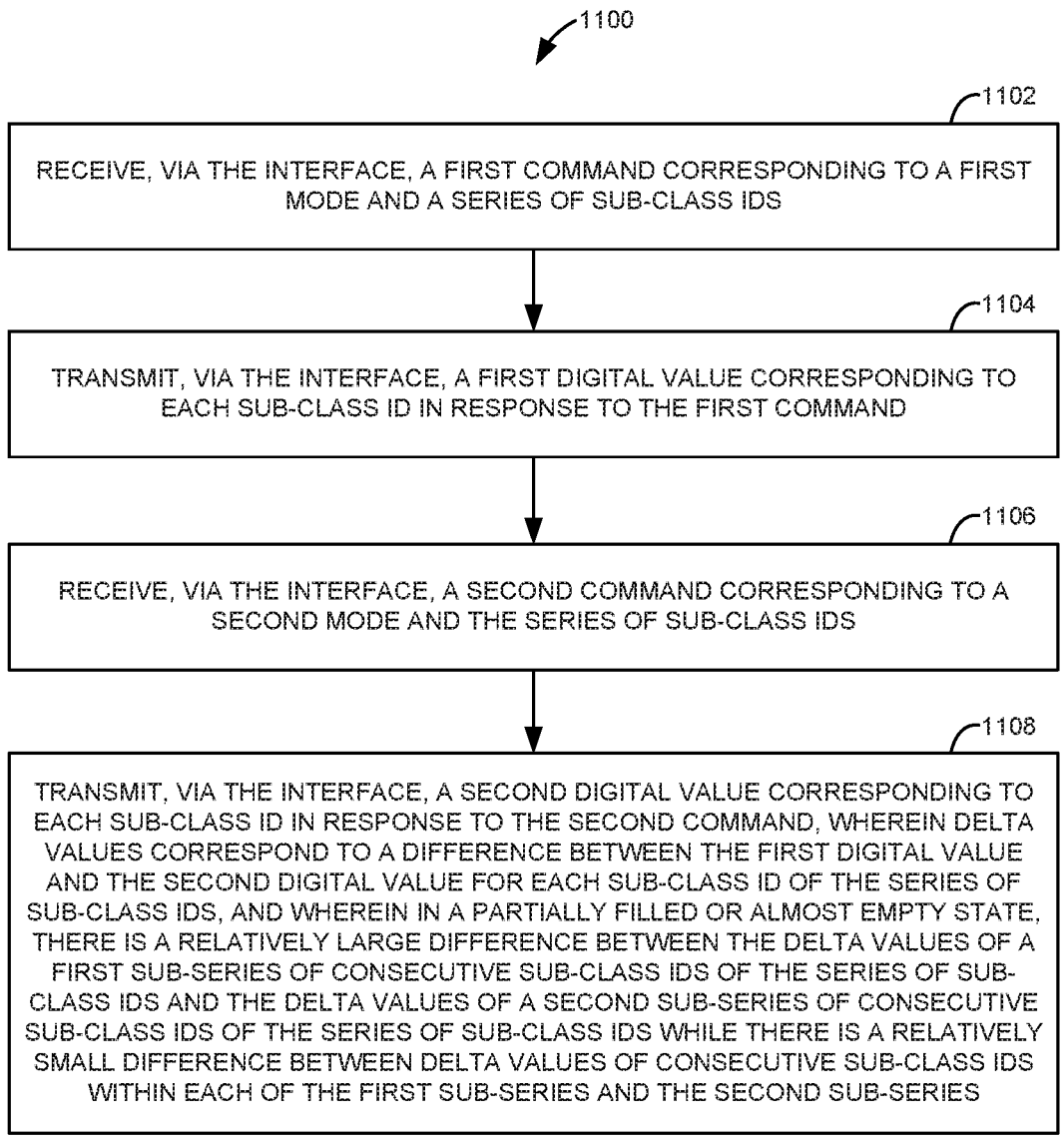
FIG. 11 is a flow diagram illustrating another example method that may be carried out by a logic circuitry package.

FIG. 11 is a flow diagram illustrating another example method 1100 that may be carried out by a logic circuitry package, such as logic circuitry package 400a-400d or 1300 to be described with reference to FIG. 13, or by processing circuitry 424. In this example, the logic circuitry package includes an interface (e.g., an I2C interface) to communicate with a print apparatus logic circuit and at least one logic circuit. The logic circuitry package may be used in a replaceable print apparatus component including a print material reservoir (e.g., 701 of FIG. 7) storing print material (e.g., 702) and a print material output (516 of FIG. 5B) to connect to a print material input of a print apparatus and output the print material towards the print apparatus. The logic circuitry package of this example may not necessarily include the complex sensor cell arrays of other examples of this disclosure. Rather, an alternative logic circuitry package may be provided that largely or partly generates outputs digitally, based on data or algorithms, not necessarily based on relatively complex or expensive analog sensor circuitry, thereby providing for a potentially cheaper, more robust, and/or alternative logic circuitry package that a print apparatus logic circuit may validate. This alternative example may respond in a similar fashion to heat, no-heat and/or sub-class ID commands as the earlier examples, to emulate an expected behavior for validation by the print apparatus logic circuit.

At 1102, the at least one logic circuit may receive, via the interface, a first command corresponding to a first mode (e.g., unheated) and a series of sub-class IDs (e.g., sensor IDs). At 1104, the at least one logic circuit may transmit, via the interface, a first digital value (e.g., count) corresponding to each sub-class ID in response to the first command. At 1106, the at least one logic circuit may receive, via the interface, a second command corresponding to a second mode (e.g., heated) and the series of sub-class IDs. At 1108, the at least one logic circuit may transmit, via the interface, a second digital value (e.g., count) corresponding to each sub-class ID in response to the second command. Delta values correspond to a difference between the first digital value and the second digital value for each sub-class ID of the series of sub-class IDs. In a partially filled or almost empty state, there is a relatively large difference (e.g., at least 25 counts per sensor cell reading) between the delta values of a first sub-series of consecutive sub-class IDs of the series of sub-class IDs and the delta values of a second sub-series of consecutive sub-class IDs of the series of sub-class IDs while there is a relatively small difference (e.g., 0 to 4 counts per sensor cell reading) between delta values of consecutive sub-class IDs within each of the first sub-series and the second sub-series (e.g., see FIG. 9A). In a filled state of the reservoir, there is a relatively small difference (e.g., 0 to 4 counts per sensor cell reading) between the delta values of consecutive sub-class IDs of the series of sub-class IDs. The relatively large difference may correspond to the step change 904 in FIG. 9A, between the first and second sub-series of sub-class IDs. The relatively small differences may correspond to the smaller steps or more constant slopes at both sides of the step change 904, as indicated by 906 and 902, corresponding to both sub-series of sub-class IDs. "Consecutive" can be interpreted as following each other in a command stream, which may involve counting up or down the sub-class series, by one or more counts, addressing each sub-class ID or skipping one or more sub-class IDs between two consecutively addressed sub-class IDs. In response to receiving the commands, the logic circuit may return values that the print apparatus logic circuit interprets as valid print material level related outputs.

In one example, the at least one logic circuit is configured to transmit first digital values and second digital values that are different. The first digital values and the second digital values may be count values, and at least a portion of the second digital values may be less than the first digital values. In one example, the relatively large difference is associated with a sub-class ID between or at a corresponding end of one of the first sub-series and the second sub-series, and the at least one logic circuit is configured to, in a partially filled state and while the component outputs print material, gradually change the sub-class ID associated with the relatively large difference so that the number of sub-class IDs of the first sub-series gradually decreases and the number of sub-class IDs of the second sub-series gradually increases. The at least one logic circuit may, in a partially filled state and while the component outputs print material, increase the sub-class ID associated with the relatively large difference. In one example, these outputs are generated without using a sensor. The print apparatus logic circuit may associate each single ID count shift of the sub-class ID associated with the step change with a certain decrease of print material weight, for example of 1 mg or less. The gradual shift may occur after a certain count of pages and/or print jobs to the extent the logic circuit can determine or derive this from communications with the print apparatus logic circuit. Hence, the logic circuit may be configured to gradually change/increase the sub-class ID(s) associated with the relatively large difference based on certain input parameters other than sensor signals, for example at least one of a print liquid level or status field, one or more power-ons of the logic circuit, a number of communications with the logic circuit by the print apparatus logic circuit, a count of print jobs, specific communications by the print apparatus logic circuit, and a time or date clock. For example, the logic circuit may store at least one look-up table and/or algorithm that associates input parameters with to-be-generated outputs for each sub-class ID.

Figure 12A:
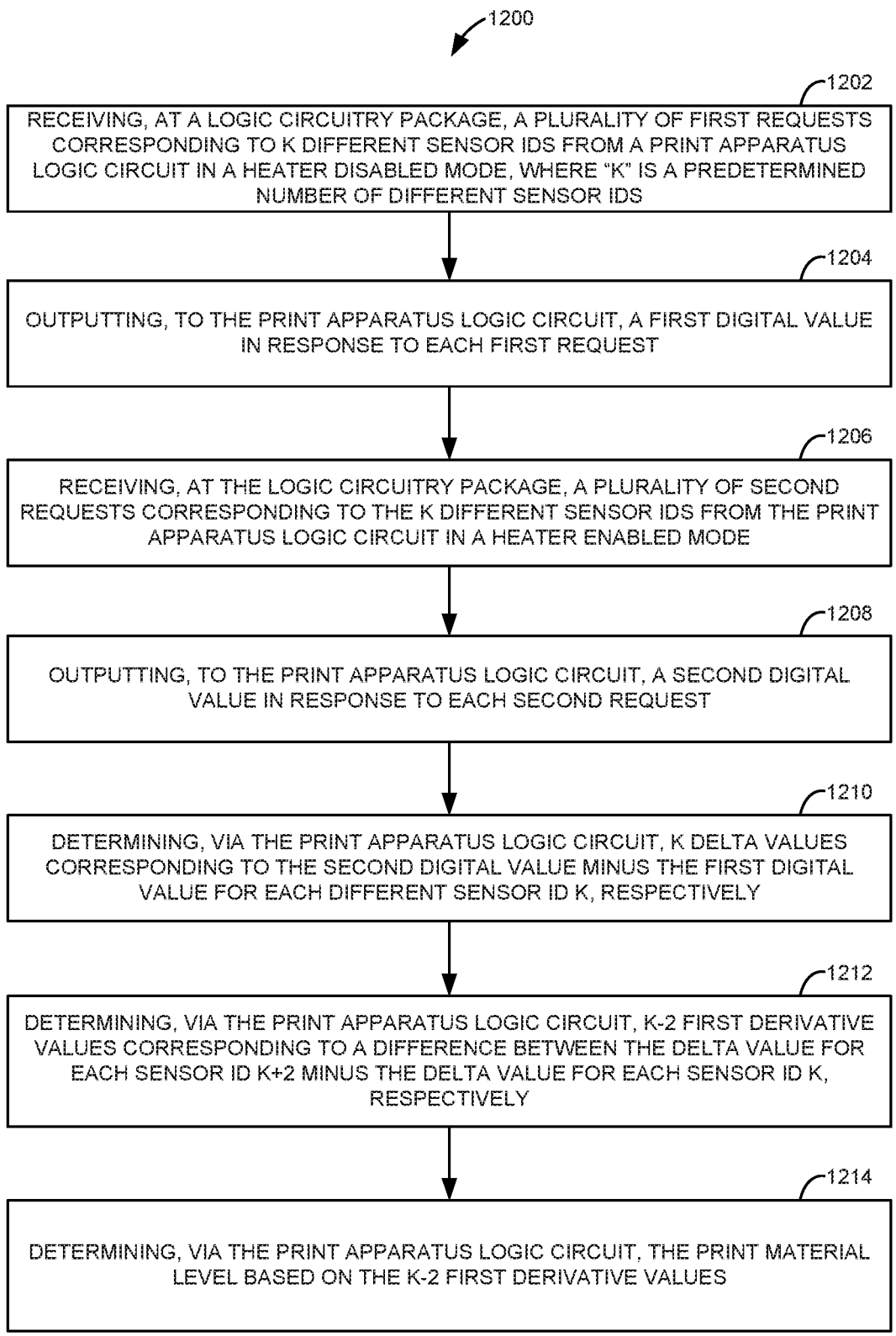
FIGS. 12A-12C are flow diagrams illustrating other example methods that may be carried out by a logic circuitry package.
Figure 12B:
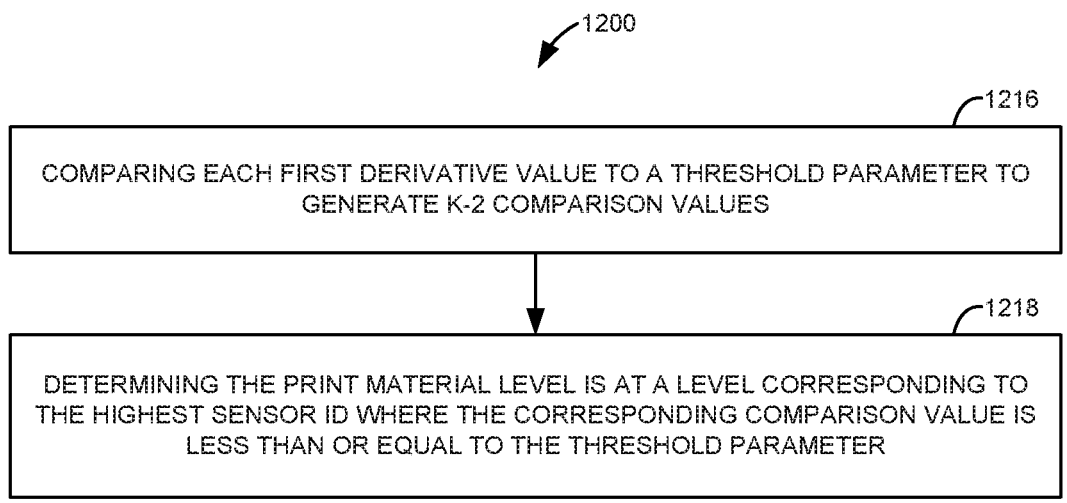
Figure 12C:
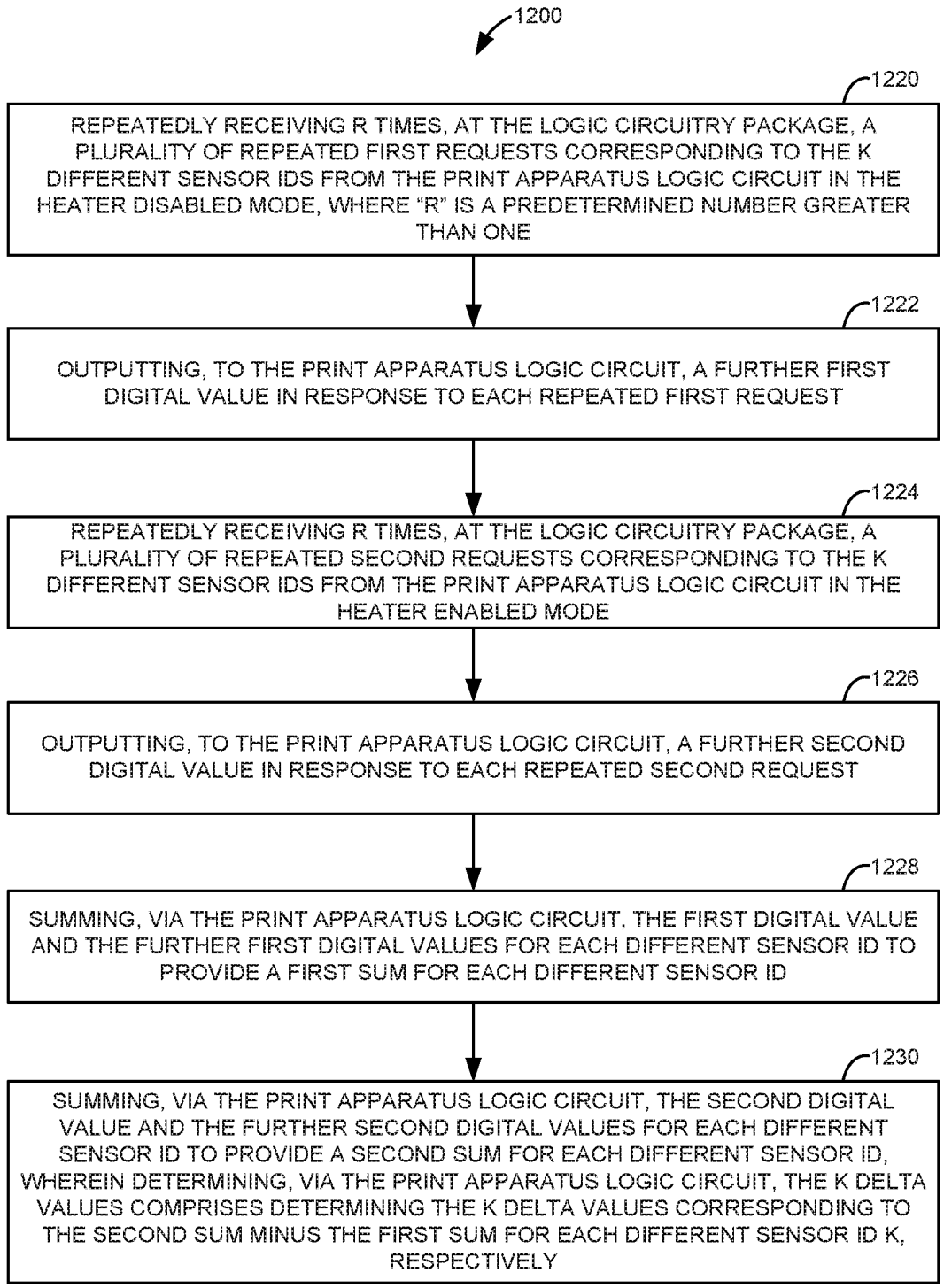

FIGS. 12A-12C are flow diagrams illustrating other example methods 1200 that may be carried out by a logic circuitry package, such as logic circuitry package 400a-400d or by processing circuitry 424. As illustrated in FIG. 12A at 1202, method 1200 includes receiving, at a logic circuitry package, a plurality of first requests corresponding to k different sensor IDs from a print apparatus logic circuit in a heater disabled mode, where "k" is a predetermined number of different sensor IDs. At 1204, method 1200 includes outputting, to the print apparatus logic circuit, a first digital value in response to each first request. At 1206, method 1200 includes receiving, at the logic circuitry package, a plurality of second requests corresponding to the k different sensor IDs from the print apparatus logic circuit in a heater enabled mode. At 1208, method 1200 includes outputting, to the print apparatus logic circuit, a second digital value in response to each second request. At 1210, method 1200 includes determining, via the print apparatus logic circuit, k delta values corresponding to the second digital value minus the first digital value for each different sensor ID k, respectively. At 1212, method 1200 includes determining, via the print apparatus logic circuit, k−2 first derivative values corresponding to a difference between the delta value for each sensor ID k+2 minus the delta value for each sensor ID k, respectively. At 1214, method 1200 includes determining, via the print apparatus logic circuit, the print material level based on the k−2 first derivative values (e.g., see FIG. 9B).

In one example, determining, via the print apparatus logic circuit, the print material level based on the k−2 first derivative values is illustrated in FIG. 12B. As illustrated in FIG. 12B at 1216, method 1200 may further include comparing each first derivative value to a threshold parameter to generate k−2 comparison values. At 1218, method 1200 may include determining the print material level is at a level corresponding to the highest sensor ID where the corresponding comparison value is less than or equal to the threshold parameter.

As illustrated in FIG. 12C at 1220, method 1200 may further include repeatedly receiving r times, at the logic circuitry package, a plurality of repeated first requests corresponding to the k different sensor IDs from the print apparatus logic circuit in the heater disabled mode, where "r" is a predetermined number greater than one. At 1222, method 1200 may include outputting, to the print apparatus logic circuit, a further first digital value in response to each repeated first request. At 1224, method 1200 may include repeatedly receiving r times, at the logic circuitry package, a plurality of repeated second requests corresponding to the k different sensor IDs from the print apparatus logic circuit in the heater enabled mode. At 1226, method 1200 may include outputting, to the print apparatus logic circuit, a further second digital value in response to each repeated second request. At 1228, method 1200 may include summing, via the print apparatus logic circuit, the first digital value and the further first digital values for each different sensor ID to provide a first sum for each different sensor ID. At 1230, method 1200 may include summing, via the print apparatus logic circuit, the second digital value and the further second digital values for each different sensor ID to provide a second sum for each different sensor ID. In this case, determining, via the print apparatus logic circuit, the k delta values comprises determining the k delta values corresponding to the second sum minus the first sum for each different sensor ID k, respectively.

Figure 13:
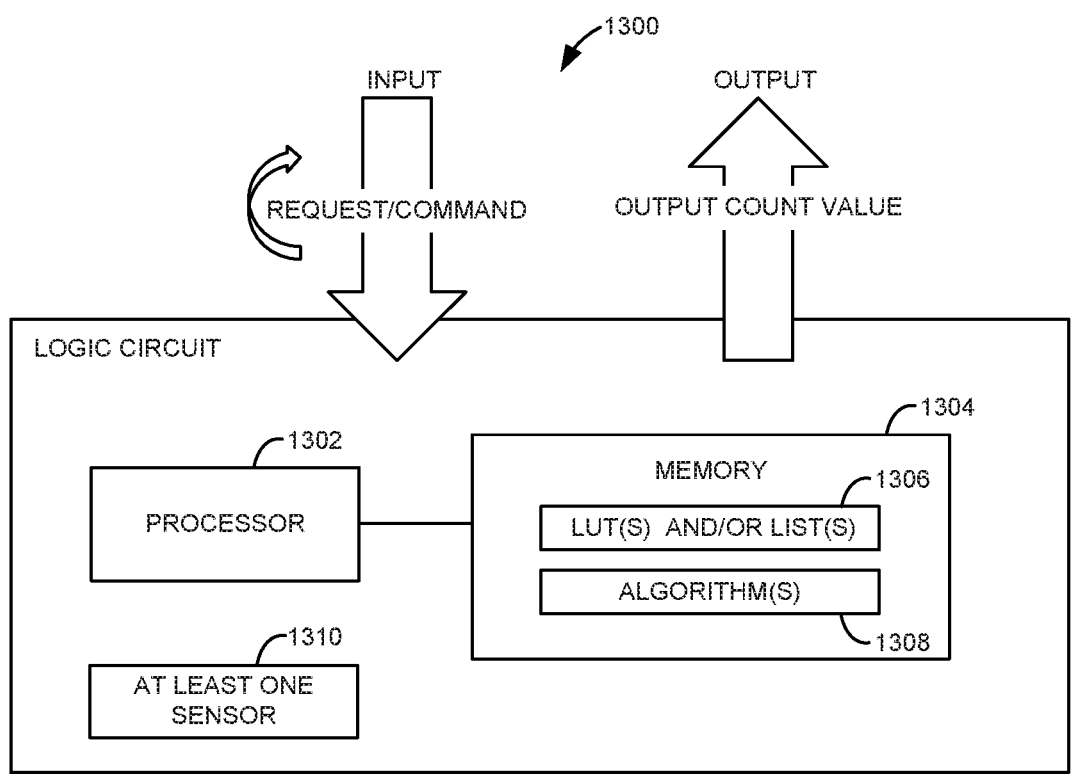
FIG. 13 illustrates another example of a logic circuitry package.

FIG. 13 illustrates another example of a logic circuitry package 1300. FIG. 13 illustrates how the logic circuitry package 1300 may generate a digital output (e.g., output count value) based on a request or command (e.g. including inputs such as a sensor ID and/or calibration parameters) sent digitally by the print apparatus. The sensor ID may be part of class parameters. The requests may include the class parameters. Logic circuitry package 1300 includes a logic circuit with a processor 1302 communicatively coupled to a memory 1304. Memory 1304 may store look up table(s) and/or list(s) 1306 and/or algorithm(s) 1308. Logic circuitry package 1300 may also include any of the features of logic circuitry packages 400a-400d or processing circuitry 424.

For example, the logic circuitry package 1300 may include at least one sensor 1310, or multiple sensors of different types. In one example, the logic circuitry package 1300 may not be provided with sensors. The logic circuit may be configured to consult a respective sensor 1310, and/or LUT(s) (look-up table)/list(s) 1306 and/or algorithm(s) 1308, based on the class (i.e., sensor ID) and calibration parameters, to generate the digital output. In this disclosure, any list or table that is used to associated sensor IDs (i.e., classes) and sensor sub-IDs (i.e., sub-classes) with output values may be defined as a LUT. The at least one sensor 1310 may include a sensor to detect a pneumatic event such as a prime pressure, an ink level within a print material reservoir of a replaceable print component, a sensor to detect an approximate temperature, and/or other sensors. In one example, the sensor 1310 may be the temperature sensor 450 or 454 while a response indicating a presence of a pneumatic event or a print material level may be emulated based on the LUT and/or algorithm. In other examples, the logic circuitry package 1300 includes a plurality of sensors of different types, for example, at least two sensors of different types, wherein the logic circuit may be configured to select and consult one of the sensors based on the received class parameters, and output a digital value based on a signal of the selected sensor, while a LUT or algorithm may be used to determine the output digital value based on both the sensor signal and received class parameter (e.g., sensor ID). In another example, the logic circuit may be configured to select and consult a respective LUT listing or algorithm based on the received sensor ID to generate the digital value, for example, without using a sensor signal.

As already explained above, received parameters may include calibration parameters, address parameters, and sensor (sub) ID/class parameters. Different sets of all the parameters are related to the different output count values as already explained above, whereby the output count value associated with the parameters is one that is accepted by the print apparatus logic circuit. The output count values may be generated using the LUT(s) and or list(s) 1306 and/or algorithm(s) 1308 whereby the parameters may be used as input. In addition, a signal of at least one sensor 1310 may be consulted as input for the LUT. In this case, the output count values may be digitally generated, rather than obtained from analog sensor measurements. For example, logic circuitry package 1300 may implement method 1000 of FIGS. 10A and 10B, method 1100 of FIG. 11, and/or method 1200 of FIGS. 12A-12C without converting any actual sensor measurements. In another example, analog sensor measurements may be used to thereafter digitally generate the output count value, not necessarily directly converted, but rather, using a LUT, list or algorithm, whereby the sensor signal is used to choose a portion or function of the LUT, list or algorithm. The example logic circuitry package 1300 may be used as an alternative to the complex thin film sensor arrays addressed elsewhere in this disclosure. The example logic circuitry package 1300 may be configured to generate outputs that are validated by the same print apparatus logic circuit designed to be compatible with the complex sensor array packages. The alternative package 1300 may be cheaper or simpler to manufacture, or simply be used as an alternative to the earlier mentioned packages, for example to facilitate printing and validation by the print apparatus. The alternative package may be more robust, because fully or partially digitally generated/emulated signals may be more reliable than output that needs to rely on analog sensor signals that can be relatively difficult to control.

In one example, the logic circuitry packages described herein mainly include hardwired routings, connections, and interfaces between different components. In another example, the logic circuitry packages may also include at least one wireless connection, wireless communication path, or wireless interface, for internal and/or external signaling, whereby a wirelessly connected element may be considered as included in the logic circuitry package and/or replaceable component. For example, certain sensors may be wireless connected to communicate wirelessly to the logic circuit/sensor circuit. For example, sensors such as pressure sensors and/or print material level sensors may communicate wirelessly with other portions of the logic circuit. These elements, that communicate wirelessly with the rest of the logic circuit, may be considered part of the logic circuit or logic circuitry package. Also, the external interface of the logic circuitry package, to communicate with the print apparatus logic circuit, may include a wireless interface. Also, while reference may be made to power routings, power interfaces, or charging or powering certain cells, certain examples of this disclosure may include a power source such as a battery or a power harvesting source that may harvest power from data or clock signals.

Certain example circuits of this disclosure relate to outputs that vary in a certain way in response to certain commands, events and/or states. It is also explained that, unless calibrated in advance, responses to these same events and/or states may be "clipped", for example so that they cannot be characterized or are not relatable to these commands, events and/or states. For these example circuits where the output needs to be calibrated to obtain the characterizable or relatable output, it should be understood that also before required calibration (or installation) occurred these circuits are in fact already "configured" to provide for the characterizable output, that is, all means are present to provide for the characterizable output, even where calibration is yet to occur. It may be a matter of choice to calibrate a logic circuit during manufacture and/or during customer installation and/or during printing, but this does not take away that the same circuit is already "configured" to function in the calibrated state. For example, when sensors are mounted to a reservoir wall, certain strains in that wall over the lifetime of the component may vary and may be difficult to predict while at the same time these unpredictable strains affect the output of the logic circuit. Different other circumstances such as conductivity of the print material, different packaging, in-assembly-line-mounting, etc. may also influence how the logic circuit responds to commands/events/states so that a choice may be made to calibrate at or after a first customer installation. In any of these and other examples, it is advantageous to determine (operational) calibration parameters in-situ, after first customer installation and/or between print jobs, whereby, again, these should be considered as already adapted to function in a calibrated state. Certain alternative (at least partly) "virtual" embodiments discussed in this disclosure may operate with LUTs or algorithms, which may similarly generate, before calibration or installation, clipped values, and after calibration or installation, characterizable values whereby such alternative embodiment, should also be considered as already configured or adapted to provide for the characterizable output, even before calibration/installation.

In one example, the logic circuitry package outputs count values in response to read requests. In many examples, the output of count values is discussed. In certain examples, each separate count value is output in response to each read request. In another example, a logic circuit is configured to output a series or plurality of count values in response to a single read request. In other examples, output may be generated without a read request.

Each of the logic circuitry packages 400a-400d, 1300 described herein may have any feature of any other logic circuitry packages 400a-400d, 1300 described herein or of the processing circuitry 424. Any logic circuitry packages 400a-400d, 1300 or the processing circuitry 424 may be configured to carry out at least one method block of the methods described herein. Any first logic circuit may have any attribute of any second logic circuit, and vice versa.

Examples in the present disclosure can be provided as methods, systems or machine readable instructions, such as any combination of software, hardware, firmware or the like. Such machine readable instructions may be included on a machine readable storage medium (including but not limited to EEPROM, PROM, flash memory, disc storage, CD-ROM, optical storage, etc.) having machine readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some blocks in the flow charts and block diagrams, as well as combinations thereof can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus, functional modules of the apparatus and devices (for example, logic circuitry and/or controllers) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a machine readable storage (e.g., a tangible machine readable medium) that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

The word "comprising" does not exclude the presence of elements other than those listed in a claim, "a" or "an" does not exclude a plurality, and a single processor or other unit may fulfill the functions of several units recited in the claims.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A logic circuitry package comprising:
   an interface to communicate with a print apparatus logic circuit, and
   at least one logic circuit configured to:
      receive, via the interface, a plurality of first requests in a heater disabled mode, each first request corresponding to a different sensor ID of a plurality of sensor IDs;
      transmit, via the interface, a first digital value in response to each first request;
      receive, via the interface, a plurality of second requests in a heater enabled mode, each second request corresponding to a different sensor ID of the plurality of sensor IDs; and
      transmit, via the interface, a second digital value in response to each second request,
      wherein delta values corresponding to a difference between the first digital value and the second digital value for each different sensor ID of the plurality of sensor IDs are indicative of a print material level,
   wherein the at least one logic circuit is configured to:
      receive, via the interface, a plurality of repeated first requests in the heater disabled mode, each repeated first request corresponding to a different sensor ID of the plurality of sensor IDs;
      transmit, via the interface, a further first digital value in response to each repeated first request;
      receive, via the interface, a plurality of repeated second requests in the heater enabled mode, each repeated second request corresponding to a different sensor ID of the plurality of sensor IDs; and
      transmit, via the interface, a further second digital value in response to each repeated second request,
      wherein delta values corresponding to a difference between a sum of the first digital value and the further first digital value and a sum of the second digital value and the further second digital value for each different sensor ID of the plurality of sensor IDs are indicative of the print material level.

2. The logic circuitry package of claim 1, wherein a difference between a delta value for a sensor ID of the plurality of sensor IDs and a delta value for a sensor ID plus two of the plurality of sensor IDs being less than or equal to a threshold parameter indicates the print material level.

3. The logic circuitry package of claim 2, wherein the threshold comprises a first value when the print material level is above a predetermined level and a second value less than the first value when the print material is below the predetermined level.

4. The logic circuitry package of claim 2, wherein the at least one logic circuit comprises a memory storing the threshold parameter.

5. The logic circuitry package of claim 1, wherein the at least one logic circuit is configured to receive the plurality of first requests in a sequential order of the different sensor IDs of the plurality of sensor IDs.

6. The logic circuitry package of claim 1, wherein the at least one logic circuit is configured to receive the plurality of first requests in a random order of the different sensor IDs of the plurality of sensor IDs.

7. The logic circuitry package of claim 1, further comprising:
   a sensor to determine the print material level, wherein the sensor comprises a plurality of heater cells and a corresponding plurality of temperature sensor cells.

8. The logic circuitry package of claim 7, wherein each first digital value and each second digital value corresponds to a temperature of a temperature sensor cell corresponding to a different sensor ID of the plurality of sensor IDs.

9. The logic circuitry package of claim 7, wherein in the heater disabled mode, the at least one logic circuit is configured to disable each heater cell of the plurality of heater cells.

10. The logic circuitry package of claim 7, wherein in the heater enabled mode, the at least one logic circuit is configured to enable a corresponding heater cell of the plurality of heater cells for a predetermined period in response to each second request.

11. The logic circuitry package of claim 10, wherein the at least one logic circuit is configured to transmit each second digital value in response to the predetermined period for the corresponding heater cell elapsing.

12. The logic circuitry package of claim 10, wherein the at least one logic circuit comprises a memory storing the predetermined period.

13. A replaceable print apparatus component, comprising:
    the logic circuitry package of claim 1;
    a print material reservoir; and
    a print material within the reservoir having a print material level.

14. The replaceable print apparatus component claim 13, further comprising:
    a housing having a height, a width less than the height, and a length greater than the height, the height parallel to a vertical reference axis, and the width extending between two sides; and
    a print material output,
    wherein the print material reservoir is within the housing.

15. The replaceable print apparatus component of claim 14, further comprising:
    an air input above the print material output.

16. The replaceable print apparatus component of claim 15, wherein the interface comprises interface pads for communicating with a print apparatus logic circuit, the interface pads provided at an inner side of one of the sides facing a cut-out for a data interconnect to be inserted, the interface pads extending along a height direction near a top and front of the component above the air input,
    wherein the air input is provided at the front on the same vertical reference axis parallel to the height direction, and
    wherein the vertical reference axis is parallel to and distanced from an axis that intersects the interface pads.

17. A replaceable print apparatus component comprising:
    a print material reservoir storing print material;
    a print material output to connect to a print material input of a print apparatus and output the print material towards the print apparatus; and a logic circuitry package comprising an interface to communicate with a print apparatus logic circuit, and at least one logic circuit configured to:
- receive, via the interface, a first command corresponding to a first mode and a series of sub-class IDs;
- transmit, via the interface, a first digital value corresponding to each sub-class ID in response to the first command;
- receive, via the interface, a second command corresponding to a second mode and the series of sub-class IDs; and
- transmit, via the interface, a second digital value corresponding to each sub-class ID in response to the second command,
- wherein delta values correspond to a difference between the first digital value and the second digital value for each sub-class ID of the series of sub-class IDs,
- wherein in a partially filled or almost empty state, there is a relatively large difference between the delta values of a first sub-series of consecutive sub-class IDs of the series of sub-class IDs and the delta values of a second sub-series of consecutive sub-class IDs of the series of sub-class IDs while there is a relatively small difference between delta values of consecutive sub-class IDs within each of the first sub-series and the second sub-series, and
- wherein the relatively large difference is associated with a sub-class ID between or at a corresponding end of one of the first sub-series and the second sub-series, and the at least one logic circuit is configured to, in a partially filled state and while the component outputs print material, gradually change the sub-class ID associated with the relatively large difference so that the number of sub-class IDs of the first sub-series gradually decreases and the number of sub-class IDs of the second sub-series gradually increases.

18. The replaceable print apparatus component of claim 17, wherein in a filled state of the reservoir, there is a relatively small difference between the delta values of consecutive sub-class IDs of the series of sub-class IDs.

19. The replaceable print apparatus component of claim 17, wherein the first digital values and the second digital values are count values, and at least a portion of the second digital values are less than the first digital values.

20. The replaceable print apparatus component of claim 17, wherein the at least one logic circuit is configured to transmit the first digital values and the second digital values without consulting a sensor.

21. A replaceable print apparatus component comprising:
a print material reservoir storing print material;
a print material output to connect to a print material input of a print apparatus and output the print material towards the print apparatus; and
a logic circuitry package comprising an interface to communicate with a print apparatus logic circuit, and at least one logic circuit configured to:
- receive, via the interface, a first command corresponding to a first mode and a series of sub-class IDs;
- transmit, via the interface, a first digital value corresponding to each sub-class ID in response to the first command;
- receive, via the interface, a second command corresponding to a second mode and the series of sub-class IDs; and
- transmit, via the interface, a second digital value corresponding to each sub-class ID in response to the second command,
- wherein delta values correspond to a difference between the first digital value and the second digital value for each sub-class ID of the series of sub-class IDs,
- wherein in a partially filled or almost empty state, there is a relatively large difference between the delta values of a first sub-series of consecutive sub-class IDs of the series of sub-class IDs and the delta values of a second sub-series of consecutive sub-class IDs of the series of sub-class IDs while there is a relatively small difference between delta values of consecutive sub-class IDs within each of the first sub-series and the second sub-series, and
- wherein the at least one logic circuit is configured to, in a partially filled state and while the component outputs print material, increase the sub-class ID associated with the relatively large difference.

22. The replaceable print apparatus component of claim 21, wherein in a filled state of the reservoir, there is a relatively small difference between the delta values of consecutive sub-class IDs of the series of sub-class IDs.

23. The replaceable print apparatus component of claim 21, wherein the first digital values and the second digital values are count values, and at least a portion of the second digital values are less than the first digital values.

24. The replaceable print apparatus component of claim 21, wherein the at least one logic circuit is configured to transmit the first digital values and the second digital values without consulting a sensor.

* * * * *